(12) United States Patent
Kobayashi

(10) Patent No.: US 8,676,701 B2
(45) Date of Patent: Mar. 18, 2014

(54) CREDIT CARD USAGE MANAGEMENT SYSTEM, CREDIT CARD USAGE MANAGEMENT METHOD, PROGRAM, AND INFORMATION STORAGE MEDIUM

(75) Inventor: Yoshinori Kobayashi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/638,481

(22) PCT Filed: Mar. 30, 2011

(86) PCT No.: PCT/JP2011/058075
§ 371 (c)(1),
(2), (4) Date: Sep. 28, 2012

(87) PCT Pub. No.: WO2011/125765
PCT Pub. Date: Oct. 13, 2011

(65) Prior Publication Data
US 2013/0030984 A1    Jan. 31, 2013

(30) Foreign Application Priority Data

Mar. 31, 2010   (JP) .................................. 2010-083504
Mar. 31, 2010   (JP) .................................. 2010-083505

(51) Int. Cl.
*G06Q 40/00*         (2012.01)
(52) U.S. Cl.
USPC .............................................. 705/39; 705/35
(58) Field of Classification Search
USPC ..................................................... 705/39, 35
See application file for complete search history.

(56) References Cited

U.S. PATENT DOCUMENTS 5,953,710 A  *   9/1999  Fleming ........................... 705/38
7,424,732 B2 *   9/2008  Matsumoto et al. ............... 726/2

(Continued)

FOREIGN PATENT DOCUMENTS

JP    2002-083145 A    3/2002
JP    2002-183445 A    6/2002

(Continued)

OTHER PUBLICATIONS

Crone, Richard K. "The battle for Internet bill payment and presentment"; Bank Technology News; Dec. 1997.*

(Continued)

*Primary Examiner* — Edward Chang
(74) *Attorney, Agent, or Firm* — Sughrue Mion, PLLC

(57) ABSTRACT

Provided is a credit card usage management system, which allows a credit card to be used to an extent that surpasses a credit limit defined within a fixed period without increasing the credit limit. A credit card usage management device 10 stores a statement data history including a used amount and a date of use of a credit card, identification information on a deposits-and-savings account, and an available credit for the credit card in association with identification information on the credit card, identifies pieces of statement data selected by a user from among, of stored pieces of statement data, pieces of statement data whose date of use falls within a given period based on data received from a user terminal, transmits a settlement request to settle a selected statement total amount, which is obtained by summing up the used amounts respectively included in the identified pieces of statement data, from the stored deposits-and-savings account, to a settlement processing server for managing the deposits-and-savings account, and adds the selected statement total amount to the stored available credit when a completion notification of a settlement based on the settlement request is received from the settlement processing server, to thereby update the selected statement total amount.

13 Claims, 19 Drawing Sheets

(56) References Cited

U.S. PATENT DOCUMENTS

2004/0128247 A1     7/2004   Sato et al.
2005/0218211 A1   10/2005   Saso et al.

FOREIGN PATENT DOCUMENTS

| | | |
|---|---|---|
| JP | 2004-102787 A | 4/2004 |
| JP | 2004-199534 A | 7/2004 |
| JP | 2005-285054 A | 10/2005 |
| JP | 2008-171239 A | 7/2008 |
| JP | 2009-252080 A | 10/2009 |
| JP | 2000-259705 A | 9/2012 |

OTHER PUBLICATIONS

Credit Union Management; "When you wish upon an imaging system . . . the right selection process can be the shining star"; Aug. 1993.*

International Preliminary Report on Patentability dated Nov. 22, 2012 for PCT/JP2011/058075.

International Preliminary Report on Patentability dated Nov. 22, 2012 for PCT/JP2011/058084.

* cited by examiner

FIG.7

| CREDIT CARD IDENTIFICATION INFORMATION | USER NAME | EXPIRATION DATE | CREDIT LIMIT | MAIN ACCOUNT INFORMATION | SUB ACCOUNT INFORMATION | AUTHENTICATION INFORMATION |
|---|---|---|---|---|---|---|
| C0001 | userA | 01/2012 | 100,000 | B01-001-0001 | B01-001-0002 | aaa/abc |
| C0002 | userB | 01/2013 | 200,000 | B01-002-0002 | — | bbb/def |
| C0003 | userC | 01/2014 | 300,000 | B02-003-0003 | — | ccc/ghi |

FIG.8

| USAGE STATEMENT ID | DATE OF USE | SHOP OF PURCHASE | USER | PAYMENT TYPE | USED AMOUNT | ALREADY-CONFIRMED FLAG | ALREADY-SETTLED FLAG |
|---|---|---|---|---|---|---|---|
| C0001-m0001 | 2009.12.30 | shopA | userA | ONE-TIME | 10,000 | T | F |
| C0001-m0002 | 2010.1.3 | shopB | userA | REVOLVING | 20,000 | F | F |
| C0001-m0003 | 2010.1.6 | shopC | userA | ONE-TIME | 30,000 | F | F |
| C0001-m0004 | 2010.1.7 | shopD | userA | ONE-TIME | 40,000 | F | F |

FIG.9

| ACCOUNT IDENTIFICATION INFORMATION | USER NAME | DEPOSIT TYPE | DEPOSIT BALANCE |
|---|---|---|---|
| B01-001-0001 | userA | ORDINARY | 100,000 |
| B01-001-0002 | userA | ORDINARY | 50,000 |
| B01-001-0003 | userD | ORDINARY | 200,000 |
| | | | |

FIG.13

| TOP | USAGE STATEMENT | IMMEDIATE SETTLEMENT | AVAILABLE CREDIT |

MR./MS. A

CARD NUMBER C0001

- USAGE STATEMENT
- IMMEDIATE SETTLEMENT
- PAYMENT METHOD
- AVAILABLE CREDIT

FIG.14

| TOP | USAGE STATEMENT | IMMEDIATE SETTLEMENT | AVAILABLE CREDIT |

CURRENT AVAILABLE CREDIT: 0 YEN

| | DATE OF USE | SHOP OF PURCHASE | USER | PAYMENT TYPE | USED AMOUNT |
|---|---|---|---|---|---|
| ☑ | 2010.1.3 | ShopB | userA | REVOLVING | 20,000 |
| ☑ | 2010.1.6 | ShopC | userA | ONE-TIME | 30,000 |
| ☐ | 2010.1.7 | ShopD | userA | ONE-TIME | 40,000 |

SELECT

IMMEDIATE SETTLEMENT

SELECTED STATEMENT : 2 ENTRIES

SETTLEMENT AMOUNT : 50,000 YEN

AVAILABLE CREDIT
AFTER SETTLEMENT : 50,000 YEN

SCHEDULED AMOUNT
TO BE CHARGED AFTER   TOTAL 40,000 YEN
IMMEDIATE SETTLEMENT

VERIFY

FIG.16

SETTLEMENT METHOD SELECTION SCREEN

SELECT SETTLEMENT METHOD FOR IMMEDIATE SETTLEMENT.

ACCOUNT TRANSFER

ELECTRONIC MONEY

BACK

FIG.17

ACCOUNT SELECTION SCREEN

ACCOUNT 1 : B01-001-0001

ACCOUNT 2 : B01-001-0002

ADD ACCOUNT

| DATE OF USE | SHOP OF PURCHASE | USER | PAYMENT TYPE | USED AMOUNT | ACCOUNT |
|---|---|---|---|---|---|
| 2010.1.3 | ShopB | userA | REVOLVING | 20,000 | ACCOUNT 1 |
| 2010.1.6 | ShopC | userA | ONE-TIME | 30,000 | ACCOUNT 2 |

CONFIRM

FIG.18

ACCOUNT INFORMATION VERIFICATION SCREEN

ACCOUNT INFORMATION ON ACCOUNT 1 IS AS FOLLOWS.

| BRANCH NAME | DEPOSIT TYPE | ACCOUNT NUMBER | BALANCE |
|---|---|---|---|
| ABC BRANCH (001) | ORDINARY | 0001 | 100,000 |

BACK

FIG.19

DETAILS VERIFICATION SCREEN
FOR IMMEDIATE SETTLEMENT

IMMEDIATE SETTLEMENT IS EXECUTED
WITH FOLLOWING DETAILS.
PRESS EXECUTE BUTTON
IF THESE DETAILS HAVE NO PROBLEM.
PRESS BACK TO CORRECT DETAILS.

| SETTLEMENT ACCOUNT | SETTLEMENT DATE | SETTLEMENT AMOUNT |
|---|---|---|
| ACCOUNT 1 | 2010.1.10 | 20,000 |
| ACCOUNT 2 | 2010.1.10 | 30,000 |

EXECUTE  BACK

FIG.20

| TOP | USAGE STATEMENT | IMMEDIATE SETTLEMENT | AVAILABLE CREDIT |
|---|---|---|---|

CURRENT AVAILABLE CREDIT: 50,000 YEN

| | DATE OF USE | SHOP OF PURCHASE | USER | PAYMENT TYPE | USED AMOUNT |
|---|---|---|---|---|---|
| ☐ | 2010.1.7 | ShopD | userA | ONE-TIME | 40,000 |

SELECT

FIG.21

BILLING DETAILS DISPLAY SCREEN
PAYMENT IS PERFORMED
BY USING ELECTRONIC MONEY.
VERIFY DETAILS AND PRESS "NEXT".

| PAYMENT AMOUNT | 50,000 YEN |
|---|---|

NEXT

FIG.22

HOLD IC CARD
OVER IC CARD READER/WRITER.

CANCEL

FIG.23

USAGE STATEMENT
THANK YOU FOR USING.

| CURRENT TRANSACTION | PAYMENT |
|---|---|
| TRANSACTION AMOUNT | 50,000 YEN |
| BALANCE BEFORE TRANSACTION | 70,000 YEN |
| BALANCE AFTER TRANSACTION | 20,000 YEN |
| DAY/TIME OF TRANSACTION COMPLETION | 2010/1/10 13:00 |

NEXT

FIG.25

| CREDIT CARD IDENTIFICATION INFORMATION | ACCOUNT INFORMATION | | PRIORITY | SELECTION CONDITION | |
|---|---|---|---|---|---|
| | | | | STATEMENT SELECTION CONDITION | ENTIRE AMOUNT CONDITION |
| C0001 | MAIN | B01-001-0001 | 1 | PAYMENT TYPE = "REVOLVING"··· | Max 20,000 YEN |
| | SUB | B01-001-0002 | 2 | PAYMENT TYPE = All,··· | Max 50,000 YEN |

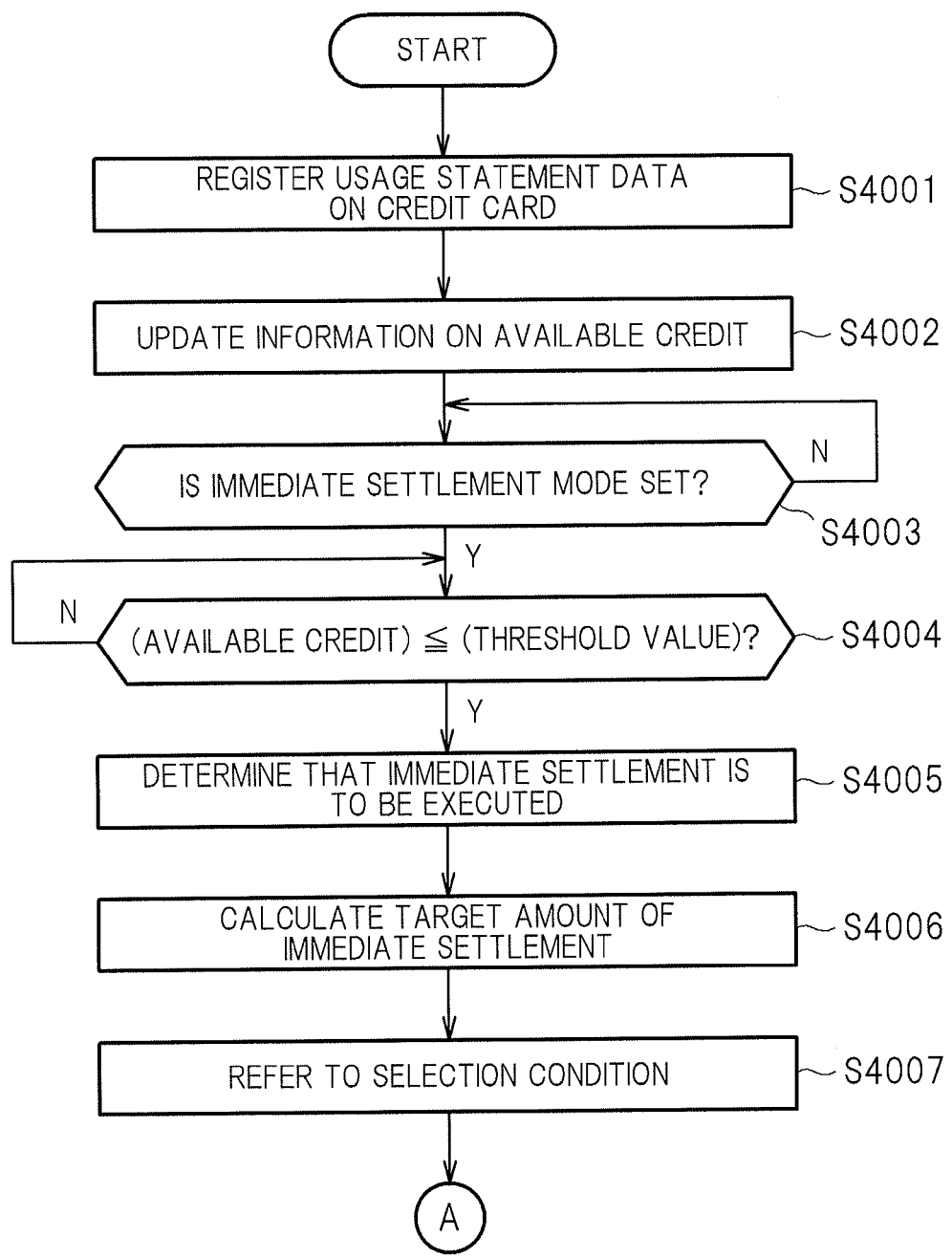

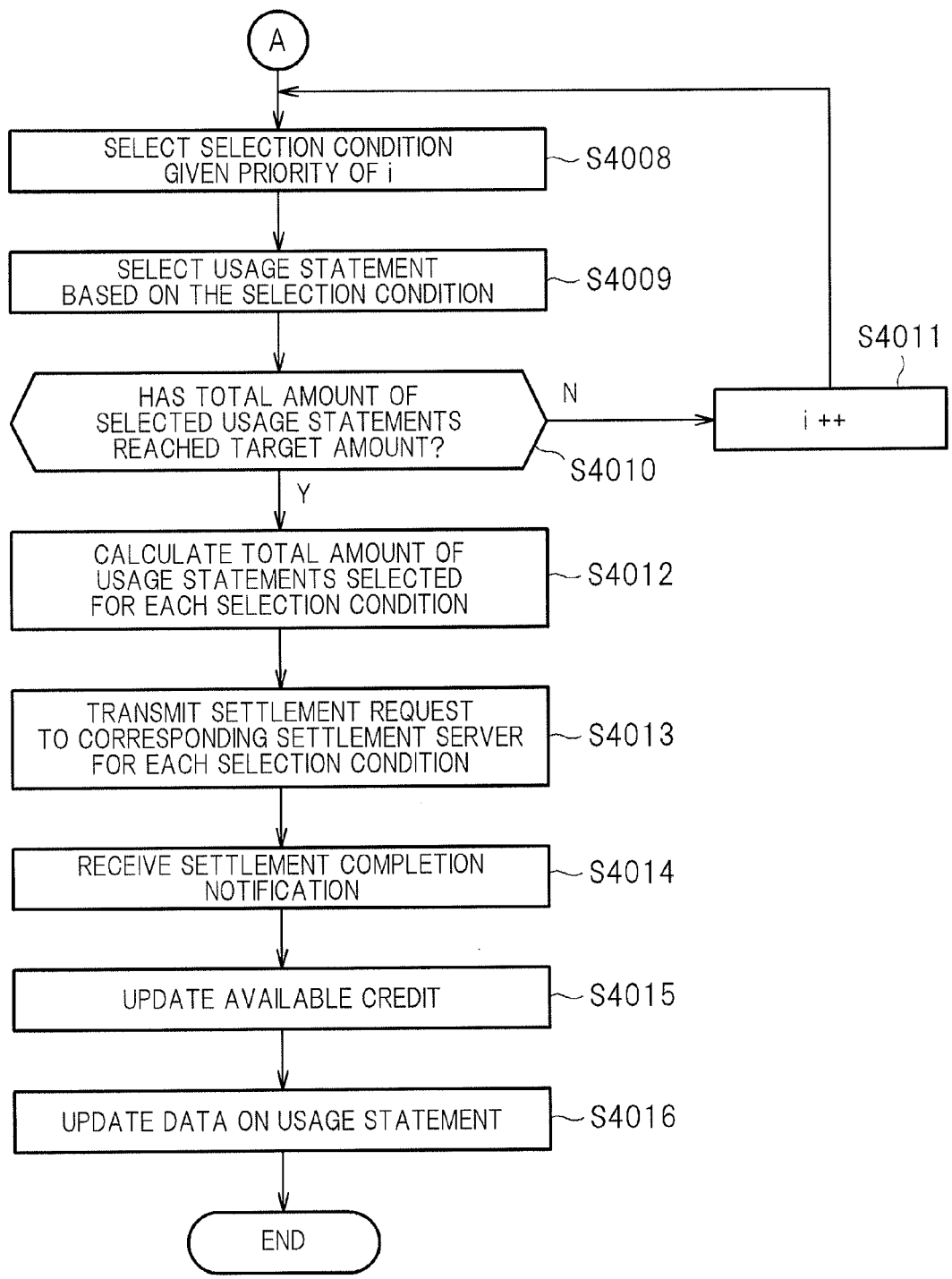

US 8,676,701 B2

CREDIT CARD USAGE MANAGEMENT SYSTEM, CREDIT CARD USAGE MANAGEMENT METHOD, PROGRAM, AND INFORMATION STORAGE MEDIUM

CROSS REFERENCE TO RELATED APPLICATIONS

This application is a National Stage of International Application No. PCT/JP2011/058075 filed on Mar. 30, 2011, which claims priority from Japanese Patent Application Nos. 2010-083504, filed on Mar. 31, 2010 and JP 2010-083505 filed on Mar. 31, 2012, the contents of all of which are incorporated herein by reference in their entirety.

TECHNICAL FIELD

The present invention relates to a credit card usage management system, a credit card usage management method, a program, and an information recording medium.

BACKGROUND ART

There are systems that allow a user terminal to access a management server for managing a usage statement of a credit card to view the usage statement of the credit card. In one of such systems, a payment method for the usage statement of the credit card designated through the user terminal can be changed from, for example, a lump-sum payment to a revolving payment (see Non Patent Literature 1).

CITATION LIST

Non Patent Literature

[Non Patent Literature 1] Rakuten KC Card Co., Ltd., "About 'atoribo (retroactive revolving payment)'", [online], Internet <http://www.rakuten-kc.co.jp/p/kc-net/payment/revo_03.html>

SUMMARY OF INVENTION

Technical Problem

However, even if a payment method for a usage statement is changed from a lump-sum payment to a revolving payment, an available credit for a credit card does not increase, and hence it is not possible to perform shopping that surpasses a credit limit defined within a fixed period by using the credit card.

An object of the present invention is to provide a credit card usage management system, a credit card usage management method, a program, and an information recording medium which allow a credit card to be used to an extent that surpasses a credit limit defined within a fixed period without increasing the credit limit.

Solution to Problem

In order to achieve the above-mentioned object, according to an aspect of the present invention, there is provided a credit card usage management system, including: extraction means for extracting pieces of statement data that enables an immediate settlement from storage means for storing a statement data history including a used amount of a credit card and an available credit for the credit card in association with identification information on the credit card; identification means for identifying pieces of statement data selected by a user from among the pieces of statement data extracted by the extraction means, based on data received from a user terminal; settlement request transmitting means for transmitting a settlement request to settle a total amount of the used amounts respectively included in the pieces of statement data identified by the identification means by using a settlement method designated by the user, to a settlement processing server corresponding to the settlement method; and available credit updating means for adding the total amount to the available credit stored in the storage means when a completion notification of a settlement based on the settlement request is received from the settlement processing server.

The credit card usage management system according to the aspect of the present invention further includes means for receiving a designation of the settlement method for each of the pieces of statement data identified by the identification means, in which: the settlement request transmitting means transmits, for each settlement method subjected to the receiving, the total amount of the used amounts respectively included in the pieces of statement data for which the settlement method is designated to the settlement processing server corresponding to the each settlement method; and the available credit updating means adds, for the each settlement method subjected to the receiving, when the completion notification of the settlement is received from the settlement processing server corresponding to the each settlement method, the total amount of the used amounts respectively included in the pieces of statement data for which the settlement method is designated to the available credit stored in the storage means.

In the credit card usage management system according to the aspect of the present invention, the identification means identifies, for each settlement method designated by the user, the pieces of statement data to be settled by using the each settlement method based on the data received from the user terminal, and the settlement request transmitting means transmits the settlement request to settle the total amount of the used amounts respectively included in the pieces of statement data identified by the identification means for the each settlement method designated by the user, to the settlement processing server corresponding to the each settlement method.

The credit card usage management system according to the aspect of the present invention further includes notification means for referring to the available credit stored in the storage means in association with the identification information on the credit card at a predetermined timing and, when the available credit satisfies a predetermined condition, notifying a destination corresponding to the identification information on the credit card, of predetermined information.

In the credit card usage management system according to the aspect of the present invention, the predetermined information includes the available credit.

In the credit card usage management system according to the aspect of the present invention, each of the pieces of statement data includes an already-settled flag indicating whether or not the settlement has been completed, and the credit card usage management system further includes statement data updating means for updating, when the completion notification of the settlement based on the settlement request is received from the settlement processing server, the already-settled flag of each of the pieces of statement data identified by the identification means to a value indicating that the settlement has been completed.

In the credit card usage management system according to the aspect of the present invention, the extraction means extracts, from among the pieces of statement data stored in the storage means, a piece of statement data whose date of use falls within a given period and whose settlement has not been completed.

In the credit card usage management system according to the aspect of the present invention, the extraction means extracts, from among the pieces of statement data stored in the storage means, apiece of statement data whose state value is a predetermined value and whose settlement has not been completed.

The credit card usage management system according to the aspect of the present invention further includes means for presenting a scheduled amount to be charged in a term corresponding to a given period based on the used amount of a piece of statement data whose date of use falls within the given period and whose settlement has not been completed among the pieces of statement data stored in the storage means.

In the credit card usage management system according to the aspect of the present invention, the available credit updating means subtracts, when a piece of statement data is newly stored in the storage means, the used amount included in the newly-stored piece of statement data from the available credit stored in the storage means.

In the credit card usage management system according to the aspect of the present invention, the settlement method designated by the user includes at least one of a payment from a deposits-and-savings account and an electronic money settlement, which is designated by the user.

According to an aspect of the present invention, there is provided a credit card usage management method, including: an extraction step of extracting, by a computer, pieces of statement data that enables an immediate settlement from storage means for storing a statement data history including a used amount of a credit card and an available credit for the credit card in association with identification information on the credit card; an identification step of identifying, by the computer, pieces of statement data selected by a user from among the pieces of statement data extracted in the extraction step, based on data received from a user terminal; a settlement request transmitting step of transmitting, by the computer, a settlement request to settle a total amount of the used amounts respectively included in the pieces of statement data identified in the identification step by using a settlement method designated by the user, to a settlement processing server corresponding to the settlement method; and an available credit updating step of adding, by the computer, the total amount to the available credit stored in the storage means when a completion notification of a settlement based on the settlement request is received from the settlement processing server.

According to an aspect of the present invention, there is provided a program for causing a computer to function as: extraction means for extracting pieces of statement data that enables an immediate settlement from storage means for storing a statement data history including a used amount of a credit card and an available credit for the credit card in association with identification information on the credit card; identification means for identifying pieces of statement data selected by a user from among the pieces of statement data extracted by the extraction means, based on data received from a user terminal; settlement request transmitting means for transmitting a settlement request to settle a total amount of the used amounts respectively included in the pieces of statement data identified by the identification means by using a settlement method designated by the user, to a settlement processing server corresponding to the settlement method; and available credit updating means for adding the total amount to the available credit stored in the storage means when a completion notification of a settlement based on the settlement request is received from the settlement processing server.

According to an aspect of the present invention, there is provided an information recording medium having recorded thereon a program for causing a computer to function as: extraction means for extracting pieces of statement data that enables an immediate settlement from storage means for storing a statement data history including a used amount of a credit card and an available credit for the credit card in association with identification information on the credit card; identification means for identifying pieces of statement data selected by a user from among the pieces of statement data extracted by the extraction means, based on data received from a user terminal; settlement request transmitting means for transmitting a settlement request to settle a total amount of the used amounts respectively included in the pieces of statement data identified by the identification means by using a settlement method designated by the user, to a settlement processing server corresponding to the settlement method; and available credit updating means for adding the total amount to the available credit stored in the storage means when a completion notification of a settlement based on the settlement request is received from the settlement processing server.

Advantageous Effects of Invention

According to the aspect of the present invention, the statement data selected by the user can be immediately settled by the settlement method designated by the user, and the total amount regarding the settlement can be added to the available credit. This allows the credit card to be used to the extent that surpasses the credit limit defined within the fixed period without increasing the credit limit.

According to the aspect of the present invention, the designation of the settlement method to be used for the immediate settlement may be received for each statement data selected by the user, which allows the user to select the settlement method to be used for each statement data of an immediate settlement subject.

According to the aspect of the present invention, the statement data to be subjected to the immediate settlement is identified for each settlement method designated by the user based on the data received from the user terminal, which allows the user to select, for each designated settlement method, the statement data to be settled by the settlement method.

According to the aspect of the present invention, it is possible to notify the user corresponding to the identification information on the credit card that the available credit stored in association with the identification information on the credit card satisfies the predetermined condition.

According to the aspect of the present invention, when the available credit stored in association with the identification information on the credit card satisfies the predetermined condition, the user corresponding to the identification information on the credit card can be notified of the current available credit.

BRIEF DESCRIPTION OF DRAWINGS

FIG. 7 A diagram illustrating an example of a card information management table.

FIG. 8 A diagram illustrating an example of a usage statement management table.

FIG. 9 A diagram illustrating an example of an account information management table.

FIG. 13 A diagram illustrating an example of a top page screen.

FIG. 14 A diagram illustrating an example of an immediate settlement statement selection screen.

FIG. 15 A diagram illustrating an example of a billing schedule screen.

FIG. 16 A diagram illustrating an example of a settlement method selection screen.

FIG. 17 A diagram illustrating an example of an account selection screen.

FIG. 18 A diagram illustrating an example of an account information verification screen.

FIG. 19 A diagram illustrating an example of a details verification screen.

FIG. 20 A diagram illustrating an example of the updated immediate settlement statement selection screen.

FIG. 21 A diagram illustrating an example of a billing details display screen.

FIG. 22 A diagram illustrating an example of a payment operation instruction screen.

FIG. 23 A diagram illustrating an example of a payment completion screen.

FIG. 25 A diagram illustrating an example of selection conditions.

FIG. 26A A flowchart of immediate settlement processing performed by the credit card usage management device according to the second embodiment.

FIG. 26B A flowchart of the immediate settlement processing performed by the credit card usage management device according to the second embodiment.

DESCRIPTION OF EMBODIMENTS

First Embodiment

A first embodiment for carrying out the present invention (hereinafter referred to as "the first embodiment") is described below with reference to the accompanying drawings.

[1. System Configuration]

Figure 1:
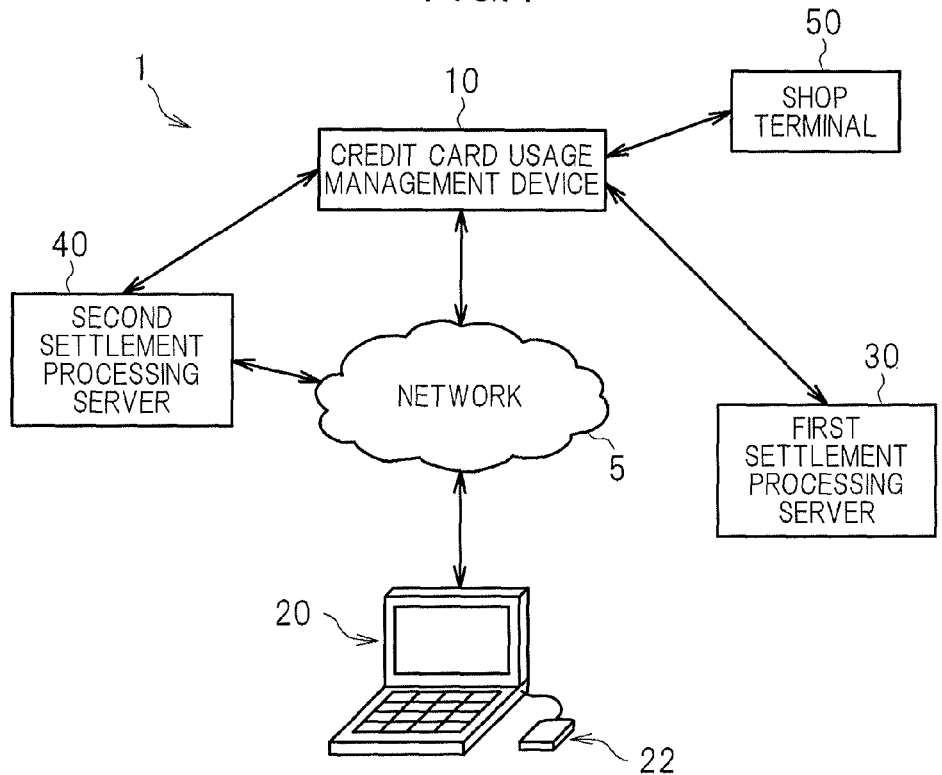
FIG. 1 A system configuration diagram of a credit card settlement system according to an embodiment of the present invention.

FIG. 1 illustrates a system configuration diagram of a credit card settlement system 1 according to the first embodiment. As illustrated in FIG. 1, the credit card settlement system 1 includes a shop terminal 50, a credit card usage management device 10, a user terminal 20, a first settlement processing server 30, and a second settlement processing server 40. In this embodiment, at least the credit card usage management device 10, the user terminal 20, and the second settlement processing server 40 are connected to a network 5 such as the Internet, but the shop terminal 50 and the first settlement processing server 30 may be connected to the network 5.

[1-1. Shop Terminal]

The shop terminal 50 is a device such as, for example, a credit authorization terminal (CAT). The shop terminal 50 has a function of reading information on a credit card of a user and requesting the credit card usage management device 10 to authorize usage of the credit card regarding a payment at a shop as well as transmitting sales information on the credit card used at the shop to the credit card usage management device 10. The shop terminal 50 and the credit card usage management device 10 are connected to each other by, for example, a dedicated line network so as to be able to perform mutual data communications.

[1-2. Credit Card Usage Management Device]

The credit card usage management device 10 is a server for managing credit information on the credit card for each credit card issued to the user as well as managing a usage history of the credit card and charging the user for a usage bill for the credit card. The credit card usage management device 10 is connected to each of the shop terminal 50, the user terminal 20, the first settlement processing server 30, and the second settlement processing server 40 so as to be able to perform mutual data communications.

[1-3. User Terminal]

The user terminal 20 is a device such as, for example, a personal computer, and in this embodiment, an IC card reader/writer 22 is connected to an input/output interface such as a USB of the user terminal 20. The IC card reader/writer 22 is a device having a function of performing data communications to/from an electronic money retaining medium (IC card) for retaining electronic money in contact or non-contact therewith and rewriting information retained in the electronic money retaining medium. The user terminal 20 is connected to the credit card usage management device 10 via the network 5 so as to be able to perform mutual data communications.

[1-4. First Settlement Processing Server]

The first settlement processing server 30 is a server for managing a deposits-and-savings account of the user. The deposits-and-savings account may be any account opened at various financial institutions such as a bank, a Shinkin bank, a credit union, and a labor bank. The first settlement processing server 30 receives settlement information (including information such as a settlement ID, account identification information, a settlement amount, a settlement term) from the credit card usage management device 10, and settles the usage bill for the credit card based on the received settlement information. The first settlement processing server 30 is connected to the credit card usage management device 10 so as to be able to perform mutual data communications.

[1-5. Second Settlement Processing Server]

The second settlement processing server 40 is a server for managing information on the issued electronic money. The second settlement processing server 40 receives the settlement information (including information such as a settlement ID, the settlement amount, and information on the user terminal 20 that performs the settlement) from the credit card usage management device 10, and controls and manages an electronic money settlement to be performed on the user terminal 20 based on the received settlement information. The second settlement processing server 40 is connected to the credit card usage management device 10 and the user terminal 20 so as to be able to perform mutual data communications.

[2. Functions of Devices that Configure the System]

Next, functions respectively provided to the shop terminal 50, the credit card usage management device 10, the user terminal 20, the first settlement processing server 30, and the second settlement processing server 40 are described in detail with reference to functional block diagrams illustrated in FIGS. 2 to 6.

[2-1. Functions of the Shop Terminal]

Figure 2:
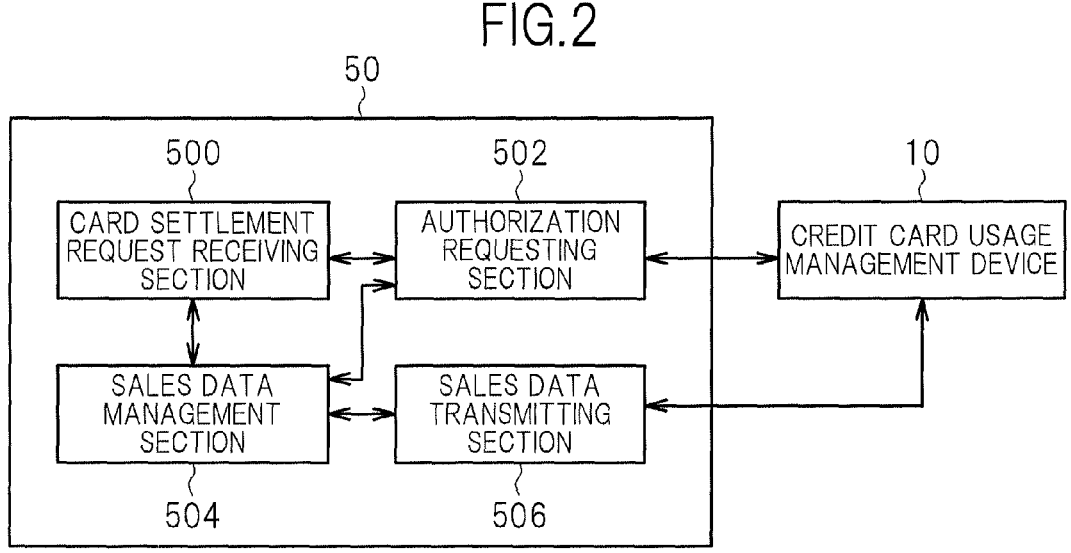
FIG. 2 A functional block diagram of a shop terminal.

FIG. 2 illustrates a functional block diagram of the shop terminal 50. As illustrated in FIG. 2, the shop terminal 50 includes, for example, a card settlement request receiving section 500, an authorization requesting section 502, a sales data management section 504, and a sales data transmitting section 506.

The card settlement request receiving section 500 receives a payment request using the credit card from the user. The card settlement request receiving section 500 outputs payment information to the authorization requesting section 502. The payment information includes a card number read from the credit card inserted into the shop terminal 50 and a payment amount input to the shop terminal 50.

The authorization requesting section 502 transmits the payment information input from the card settlement request receiving section 500 to the credit card usage management device 10 to make a query about whether or not to allow authorization for the payment information.

When the payment information for which the query has been made by the authorization requesting section 502 to the credit card usage management device 10 is authorized, the sales data management section 504 sums up sales based on the payment information to manage sales data. The sales data managed by the sales data management section 504 may include, for example, identification information on the sales data, a date, a sales amount, a payment method (including information on the credit card and information on which of a lump-sum payment and a payment in installments is to be used), and an already-transmitted flag (true-false value indicating whether or not transmission has been performed to the credit card usage management device 10).

The sales data transmitting section 506 selects, from among pieces of sales data managed by the sales data management section 504, a piece of sales data which falls within a predefined period and which has not been transmitted to the credit card usage management device 10 yet, and transmits the selected piece of sales data to the credit card usage management device 10. The sales data transmitting section 506 may transmit the sales data to the credit card usage management device 10 each time the sales data is summed up, or may transmit the untransmitted piece of sales data selected from among pieces of the sales data managed by the sales data management section 504 to the credit card usage management device 10 each time a predetermined timing arrives.

[2-2. Functions of the Credit Card Usage Management Device]

Figure 3:
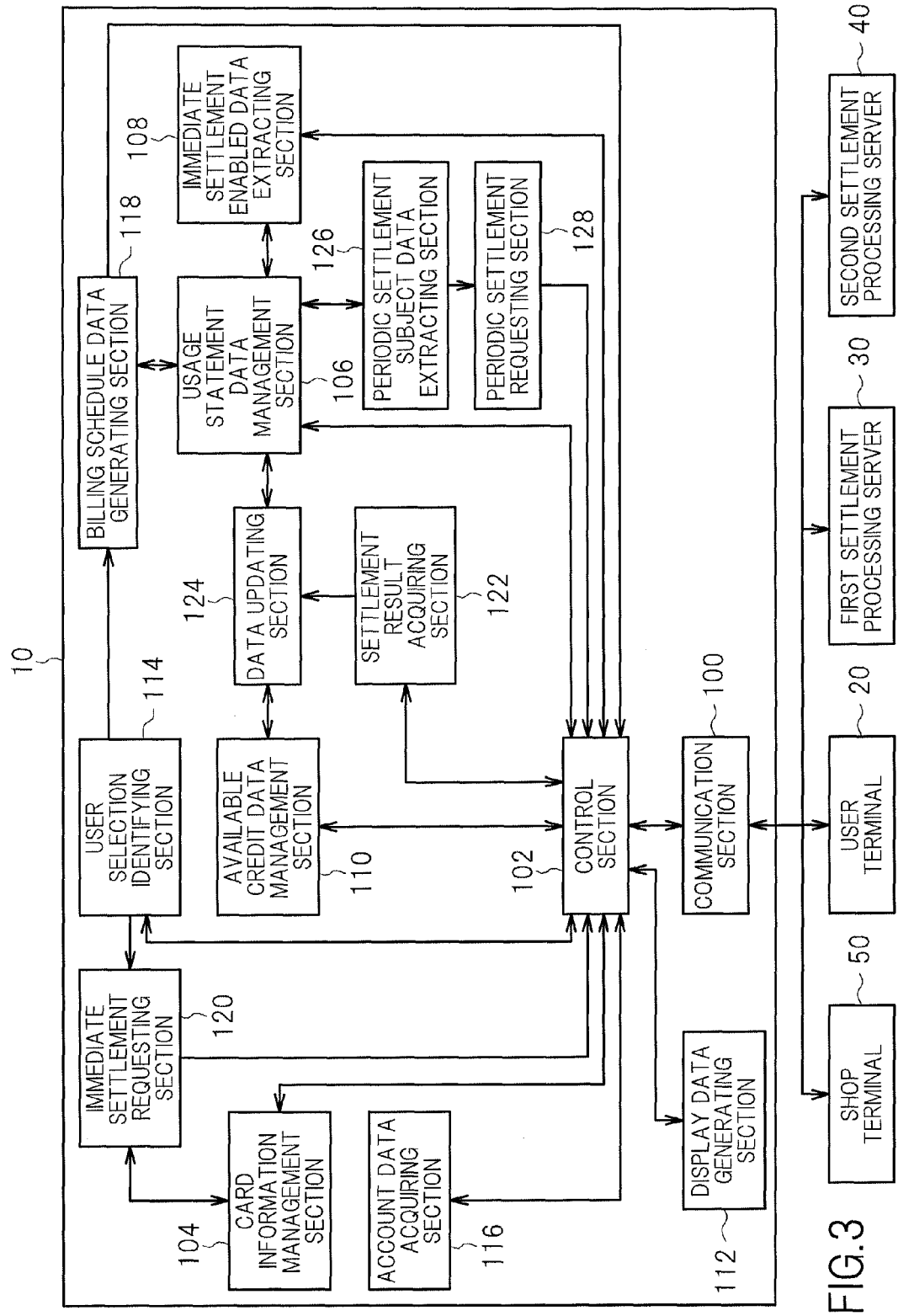
FIG. 3 A functional block diagram of a credit card usage management device.

FIG. 3 illustrates a functional block diagram of the credit card usage management device 10. As illustrated in FIG. 3, the credit card usage management device 10 includes, for example, a communication section 100, a control section 102, a card information management section 104, a usage statement data management section 106, an immediate settlement enabled data extracting section 108, an available credit data management section 110, a display data generating section 112, a user selection identifying section 114, an account data acquiring section 116, a billing schedule data generating section 118, an immediate settlement requesting section 120, a settlement result acquiring section 122, a data updating section 124, a periodic settlement subject data extracting section 126, and a periodic settlement requesting section 128. On a computer including control means such as a central processing unit (CPU), storage means such as a semiconductor memory or a magnetic disk drive, and communication means such as a network interface, the functions of the above-mentioned respective sections are implemented by the control means sequentially executing a program stored in the storage means. The program may be supplied to the credit card usage management device 10 while being stored in an information storage medium, or may be supplied to the credit card usage management device 10 via data communication means such as the Internet. Note that, in this embodiment, a database for storing data managed by the usage statement data management section 106, the available credit data management section 110, and the like is provided inside the credit card usage management device 10, but the database may be provided outside the credit card usage management device 10, and the credit card usage management device 10 may appropriately read data from the database provided outside or write data to the database.

The communication section 100 is implemented by, for example, one or a plurality of network interfaces, and performs data communications to/from external devices. In this embodiment, the communication section 100 uses the credit card usage management device 10 to perform data communications to/from each of the shop terminal 50, the user terminal 20, the first settlement processing server 30, and the second settlement processing server 40.

In addition to controlling the respective sections of the credit card usage management device 10, the control section 102 controls starting of processing in the respective sections, exchanging of data, termination, and the like. For example, when data is received by the communication section 100, the control section 102 may determine which program is used to process the received data.

The card information management section 104 manages information relating to the issued credit card. FIG. 7 illustrates an example of a card information management table managed by the card information management section 104. In the example of the card information management table illustrated in FIG. 7, a user name, an expiration date, a credit limit, main account information, sub account information, and authentication information are stored in association with identification information on the credit card. The identification information on the credit card may be, for example, the card number for uniquely identifying the credit card. The user name may be a name of a person to which the credit card is issued. The expiration date is the expiration date of the credit card, and the credit limit is a ceiling amount permitted with respect to accumulation of shopping and cash advance using the credit card. The main account information may be, for example, information (account identification information) for identifying an account from which a bill for the usage of the credit card is to be paid. The account identification information may include, for example, a bank ID, a branch ID, and an account ID. The sub account information is an item for registering account information other than the main account information, and may be left unregistered if there is no particular information to be registered or may have a plurality of accounts registered. The authentication information may be a login ID/password used for authentication when the user accesses the credit card usage management device 10 to view various kinds of information on the credit card including a usage statement thereof.

The usage statement data management section 106 registers usage statement data on the credit card based on the sales data received from the shop terminal 50, and also manages a status of the registered usage statement data. Based on the sales data received by the communication section from the shop terminal 50, the usage statement data management section 106 generates and registers a record of the usage statement data in association with the identification information on the credit card included in the received sales data.

FIG. 8 illustrates an example of a usage statement management table managed by the usage statement data management section 106. As illustrated in FIG. 8, the usage statement management table may be structured by records each including respective items of a usage statement ID, a date of use, a shop of purchase, a user, a payment type, a used amount, an already-confirmed flag, and an already-settled flag. Note that, the usage statement management table is managed in association with the identification information on the credit card.

The credit card usage management device 10 first sets the usage statement registered based on the sales data received from the shop terminal 50 to a status of "temporarily confirmed" (F), and then changes the usage statement satisfying a predetermined condition at a predetermined timing after a closing date to a status of "confirmed" (T) meaning that the usage statement is confirmed as a billing subject at a time of billing that is to arrive next. The already-confirmed flag of the usage statement management table is information indicating which of confirmed (T) and temporarily confirmed (F) the usage statement is. Further, the already-settled flag is information indicating whether or not the usage statement has been settled (T) or not (F), and a value of the already-settled flag may be updated based on a settlement completion notification received from the first settlement processing server 30 or the second settlement processing server 40.

The immediate settlement enabled data extracting section 108 extracts a piece of usage statement data that enables a settlement (hereinafter referred to as immediate settlement) performed before a periodic settlement (normal settlement) from among pieces of usage statement data managed by the usage statement data management section 106. The periodic settlement is processing for settling the usage bill to be charged to the user at a monthly timing previously defined based on the usage statement whose already-confirmed flag is "confirmed" in the usage statement data management section 106. In this embodiment, the immediate settlement enabled data extracting section 108 extracts the usage statement data that has been registered by the usage statement data management section 106 and has not been changed to a "confirmed" state as immediate settlement enabled data. Specifically, the immediate settlement enabled data extracting section 108 extracts the usage statement for which the already-confirmed flag is "temporarily confirmed" (F) and the already-settled flag is uncompleted (F) in the usage statement management table managed by the usage statement data management section 106.

The available credit data management section 110 manages an available credit for each identification information on the credit card. The available credit is an entire amount that can be used with the credit card at a current time point, and is calculated by subtracting a total amount of the unsettled usage statement data from the credit limit. The available credit data management section 110 may update the available credit when statement data managed by the usage statement data management section 106 is added or when the status of the already-settled flag for the managed statement data is updated. In this embodiment, the available credit at a given time point within a unit period (for example, one month) is calculated as "(credit limit)−(amount used in the current term)+(immediate settlement amount)". Note that, the payment information on the usage of the credit card, for which an authorization request has been received from the shop terminal 50 by the credit card usage management device 10, may be authorized when, for example, the payment amount indicated in the payment information is equal to or smaller than the available credit at the current time point, and may be rejected when not.

The display data generating section 112 generates data (display data) for causing a display device of the user terminal 20, from which an access has received, to display information (screen). The display data may be generated by dynamically embedding various kinds of information, which are associated with the identification information on the credit card corresponding to a login user, into a page corresponding to a URL requested by the user terminal 20. FIGS. 13 to 23 are examples of screens displayed on the display device of the user terminal 20 based on the display data. Note that, those screens are described later in detail.

The user selection identifying section 114 identifies a piece of usage statement data selected by the user from among pieces of usage statement data extracted by the immediate settlement enabled data extracting section 108 and a settlement method for the selected piece of usage statement data. In this embodiment, the usage statement data extracted by the immediate settlement enabled data extracting section 108 is displayed in a mode that can be selected on the user terminal 20 based on the display data generated by the display data generating section 112 (see, for example, FIG. 14). Then, the user selection identifying section 114 identifies the usage statement data on an immediate settlement subject based on data indicating the identification information on the usage statement selected by the user on a display screen which has been received from the user terminal 20 by the communication section. Note that, the data received from the user terminal 20 by the communication section may include information that designates which of an account transfer and the electronic money settlement is to be used for the settlement for each usage statement. Then, information that designates a settlement account for each usage statement may be also included if the account transfer is selected as the settlement method.

Note that, the user selection identifying section 114 may receive a designation of the settlement method for each usage statement data selected by the user, or may receive the designation of the usage statement data for each settlement method selected by the user, both of which may be effected simultaneously. Further, the user selection identifying section 114 may receive data from the user, the data including the designation of the usage statement data, the designation of a plurality of settlement methods, and the designation of the settlement amount or a ratio of the settlement amount used by each of the plurality of settlement methods, and based on the received data, may identify the usage statement data to be subjected to the settlement by each of the settlement methods and an amount settled by each of the settlement methods.

The account data acquiring section 116 acquires data relating to the account information (including the main account information and the sub account information) stored in association with the identification information on the credit card. In this embodiment, information including the deposit balance of the account information may be acquired from the first settlement processing server 30 for managing the account information. When the authentication information such as the account name and the password is necessary to acquire information of the account information, the authentication information may be acquired by prompting the user to input the authentication information. The information acquired by the account data acquiring section 116 may be transmitted to the user terminal 20 and displayed thereon, and the user may be allowed to previously verify whether or not the amount sufficient for the immediate settlement amount has been deposited in the account scheduled for the settlement.

When the immediate settlement is performed with regard to the usage statement data identified by the user selection identifying section 114, the billing schedule data generating section 118 generates billing schedule data indicating an amount to be charged for the next periodic settlement. For example, the amount to be charged indicated by the billing schedule data may be calculated by subtracting a selected statement total amount, which is obtained by summing up the used amounts regarding the usage statement data identified by the user selection identifying section 114, from a total sum of the used amount regarding pieces of usage statement data whose statuses are "temporarily confirmed" and "unsettled" among pieces of usage statement data managed by the usage statement data management section 106. The billing schedule data generated by the billing schedule data generating section 118 may be transmitted to the user terminal 20 and displayed thereon, and the user may be allowed to verify the settlement amount for each of the immediate settlement and the periodic settlement.

The immediate settlement requesting section 120 requests a corresponding settlement processing server to perform the immediate settlement using the settlement method designated for each usage statement data identified by the user selection identifying section 114. In this embodiment, one of the settlement using the account transfer and the electronic money settlement can be selected as the settlement method.

The immediate settlement requesting section 120 groups the usage statement data for each designated settlement method, and assigns a settlement processing ID for identifying immediate settlement processing using each settlement method to each group. With regard to the immediate settlement processing using a transfer from the account, the immediate settlement requesting section 120 identifies the settlement processing server for managing the account (in this embodiment, first settlement processing server 30), and transmits a settlement request to the identified settlement processing server, the settlement request including the settlement processing ID, the settlement amount, and the account identification information (for example, a bank number, a branch number, and a bank account number) on a transfer source. The settlement request may further include a card company ID for identifying a card company, a URL at a time of a settlement completion, a URL at a time of a settlement cancellation, and the account identification information on a transfer destination. Then, with regard to the immediate settlement processing using the electronic money, the immediate settlement requesting section 120 identifies the settlement processing server for managing the settlement using the electronic money (in this embodiment, second settlement processing server 40), and transmits the settlement request to the identified settlement processing server, the settlement request including the settlement processing ID, the settlement amount, and identification information (address information) on the user terminal 20 for executing settlement processing.

The settlement result acquiring section 122 acquires a settlement result in response to the settlement request made by the immediate settlement requesting section 120 from the first settlement processing server 30 and from the second settlement processing server 40 with regard to the immediate settlement processing using the account transfer and with regard to the immediate settlement processing using the electronic money, respectively. Settlement result information notified of by each settlement processing server may include the settlement processing ID, a result code (true when the settlement processing is completed normally, and false when not), a processing time stamp, a payer information, and the settlement amount.

The data updating section 124 updates the data managed respectively by the usage statement data management section 106 and the available credit data management section 110 based on the settlement result acquired by the settlement result acquiring section 122. When receiving a notification that a settlement has been completed normally with regard to a given settlement processing ID, the data updating section 124 updates the already-settled flag of each usage statement data associated with the settlement processing ID to "settled" (true), and updates the available credit managed by the available credit data management section 110 by adding thereto the settlement amount associated with the settlement processing ID.

When a predetermined billing timing defined monthly arrives, the periodic settlement subject data extracting section 126 extracts a piece of usage statement data to be subjected to the periodic settlement from among pieces of usage statement data managed by the usage statement data management section 106. In this embodiment, the periodic settlement subject data extracting section 126 extracts, from among the pieces of usage statement data managed by the usage statement data management section 106, the piece of usage statement data for which the already-confirmed flag has a value of "confirmed" (true) and the already-settled flag has a value of "unsettled" (false).

The periodic settlement requesting section 128 transmits, to the first settlement processing server 30, a periodic settlement request to transfer the entire amount of the respective used amounts of the usage statement data extracted by the periodic settlement subject data extracting section 126 from the account designated in advance. The data updating section 124 may update the data managed respectively by the usage statement data management section 106 and the available credit data management section 110 based on a result of the settlement processing in response to the above-mentioned periodic settlement request which has been acquired by the settlement result acquiring section 122.

Further, at a predetermined timing such as a time of authorizing the usage of the credit card, a time of transmitting notification mail for notifying of a card usage status (including quick report information and sales information) of the credit card, or a time of verification defined periodically, the credit card usage management device 10 may refer to the available credit stored in the available credit data management section 110 in association with the identification information on the credit card, and in a case where the available credit satisfies a predetermined condition (for example, a case of being equal to or smaller than a threshold value or a case of being less than the threshold value), notify a destination (such as, for example, an electronic mail address or an account of a social network service) corresponding to the identification information on the credit card, of information including the available credit. Note that, the above-mentioned threshold value may be previously set by an administrator or the user, or may be changed depending on the number of days ranging from a current day/time to the closing date or a confirmed date for the credit card.

[2-3. Functions of the User Terminal]

Figure 4:
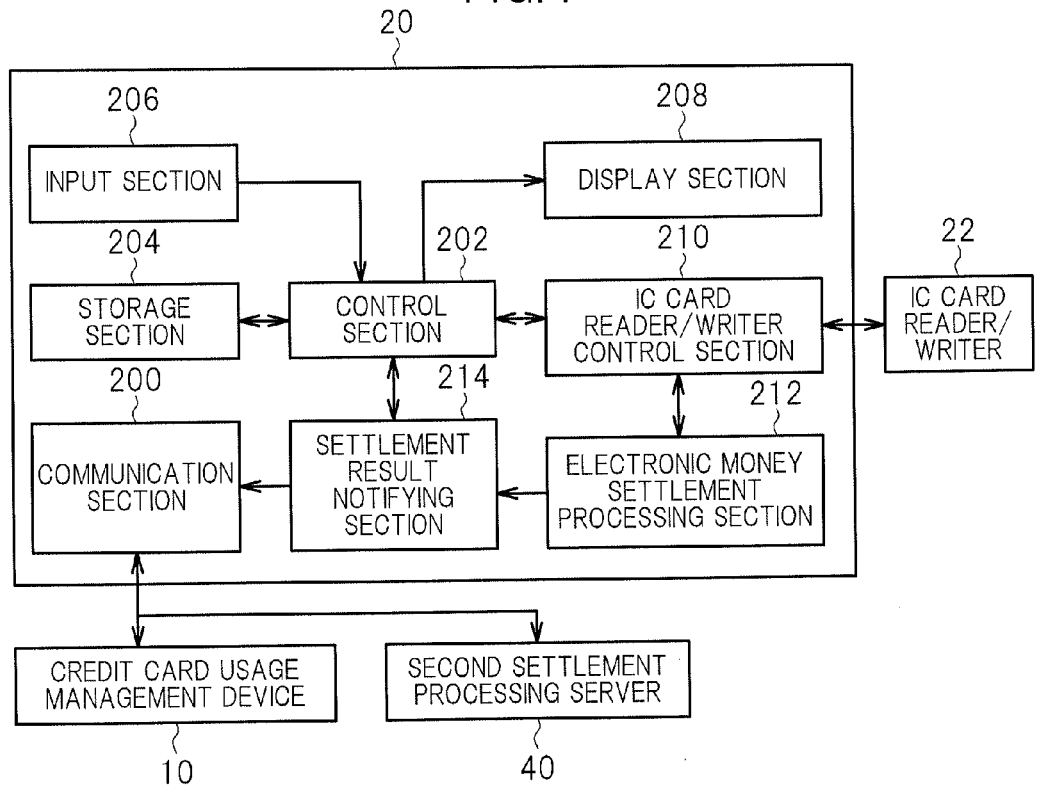
FIG. 4 A functional block diagram of a user terminal.

FIG. 4 illustrates a functional block diagram of the user terminal 20. As illustrated in FIG. 4, the user terminal 20 includes, for example, a communication section 200, a control section 202, a storage section 204, an input section 206, a display section 208, an IC card reader/writer control section 210, an electronic money settlement processing section 212, and a settlement result notifying section 214. The functions of the above-mentioned respective sections may be implemented by the control means such as a central processing unit (CPU), the storage means such as a semiconductor memory or a magnetic disk drive, the communication means such as a network interface, display means such as a liquid crystal display, input means such as a keyboard or a mouse, and input/output means such as a serial interface that are included in the computer.

The communication section 200 is implemented by, for example, the network interface, and performs data communications to/from external devices. In this embodiment, the user terminal 20 uses the communication section 200 to perform data communications to/from each of at least the credit card usage management device 10 and the second settlement processing server 40.

The control section 202 executes the program stored in the storage section 204 to control the respective sections of the user terminal 20 and execute various kinds of processing. The storage section 204 stores the program executed by the control section 202 and data therefor, and is also used as a work memory for the control section 202. In this embodiment, the storage section 204 may include an application program of a web browser, and the control section 202 may execute the application program of the web browser to access the credit card usage management device 10.

The input section 206 receives the user's input from an input device such as a keyboard and a mouse provided to or connected to the user terminal 20.

The display section 208 outputs graphic data to the display device such as a liquid crystal display, and causes the display device to display a screen. The display section 208 displays the screens illustrated in, for example, FIG. 13 to FIG. 22.

The IC card reader/writer control section 210 controls the IC card reader/writer 22 in accordance with a driver program corresponding to the IC card reader/writer 22 connected to the user terminal 20. In this embodiment, the IC card reader/writer control section 210 performs data communications to/from the electronic money retaining medium (IC card) for retaining information on the electronic money through the IC card reader/writer 22, and refers to and updates a storage content of the electronic money retaining medium.

The electronic money settlement processing section 212 executes the electronic money settlement by using the IC card reader/writer control section 210 to rewrite the storage content of the electronic money retaining medium. In this embodiment, when the user terminal 20 accesses the credit card usage management device 10 to designate specific usage statement data to select the immediate settlement using the electronic money therefor, billing data including the settlement processing ID and the settlement amount regarding the immediate settlement is transmitted from the second settlement processing server 40 that has received a request for the immediate settlement from the credit card usage management device 10. The user terminal 20 activates an electronic money settlement program in synchronization with reception of the above-mentioned billing data, and causes the display section 208 to display a screen for verifying the settlement amount and display a screen for instructing the user to perform an operation for inputting money by holding the electronic money retaining medium over the IC card reader/writer 22. When the user holds the electronic money retaining medium over the IC card reader/writer 22 in response to the above-mentioned instruction, electronic money settlement processing is executed when the amount of the electronic money retained in the electronic money retaining medium is equal to or larger than the settlement amount.

The settlement result notifying section 214 transmits the settlement result information indicating whether or not the electronic money settlement has been completed normally by the electronic money settlement processing section 212 to the second settlement processing server 40. The settlement result information may include the settlement processing ID, the result code (true when the settlement processing is completed normally, and false when not), the processing time stamp, the payer information, and the settlement amount.

[2-4. Functions of the First Settlement Processing Server]

Figure 5:
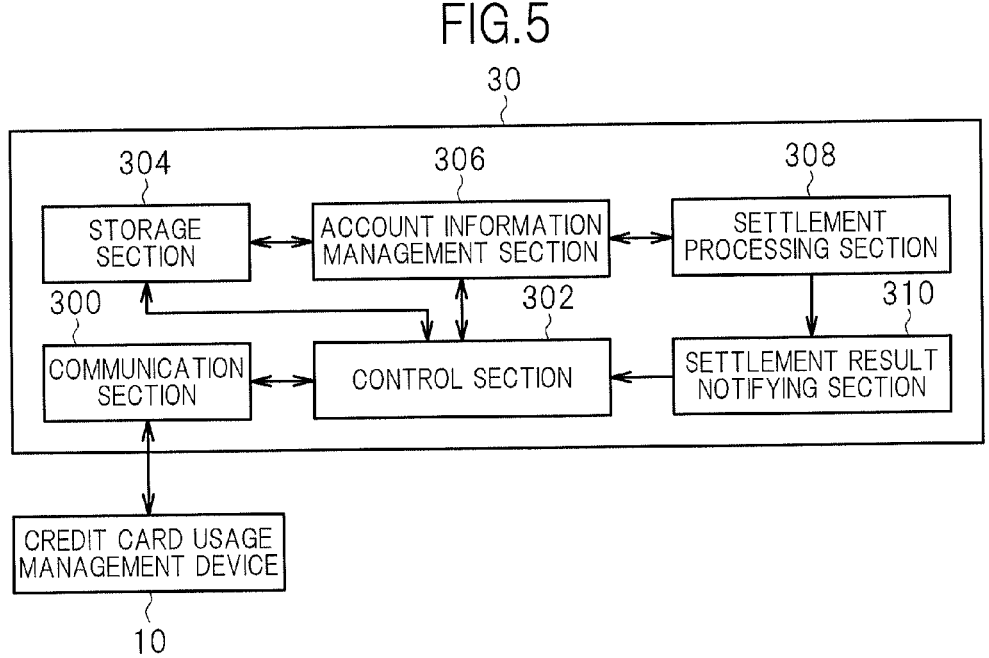
FIG. 5 A functional block diagram of a first settlement processing server.

FIG. 5 illustrates a functional block diagram of the first settlement processing server 30. As illustrated in FIG. 5, the first settlement processing server 30 includes, for example, a communication section 300, a control section 302, a storage section 304, an account information management section 306, a settlement processing section 308, and a settlement result notifying section 310. The functions of the above-mentioned respective sections may be implemented by the control means such as a central processing unit (CPU), the storage means such as a semiconductor memory or a magnetic disk drive, and the communication means such as a network interface that are included in the computer.

The communication section 300 is implemented by, for example, the network interface, and performs data communications to/from external devices. In this embodiment, the first settlement processing server 30 uses the communication section 300 to perform data communications to/from at least the credit card usage management device 10.

The control section 302 executes the program stored in the storage section 304 to control the respective sections of the first settlement processing server 30 and execute various kinds of processing. The storage section 304 stores the program executed by the control section 302 and data therefor, and is also used as a work memory for the control section 302.

The account information management section 306 manages the account information including the deposit balance of the account in association with the identification information on the account held by the user.

FIG. 9 illustrates an example of an account information management table managed by the account information management section 306. In the example of the account information management table illustrated in FIG. 9, the user name, a deposit type, and the deposit balance are stored in each record in association with the account identification information (branch number and account number).

The settlement processing section 308 executes the settlement processing based on the settlement request received from the credit card usage management device 10. In this embodiment, when receiving an input of the settlement request including information on the card company ID, the settlement processing ID, the account identification information, and the settlement amount, which is transmitted from the credit card usage management device 10, the settlement processing section 308 retrieves a record corresponding to the account identification information from the account information management table managed by the account information management section 306. In addition, the settlement processing section 308 refers to the value of an ordinary deposit balance of the above-mentioned retrieved record, and when the value is equal to or larger than the settlement amount, subtracts the settlement amount from the ordinary deposit balance to update the value of the ordinary deposit balance and outputs the fact that the settlement has been completed normally to the settlement result notifying section 310. Further, when the settlement has not been completed normally for a reason that the value of the ordinary deposit balance falls short of the settlement amount or other such reason, the fact that the settlement is uncompleted is output to the settlement result notifying section 310.

The settlement result notifying section 310 notifies the credit card usage management device 10 of the settlement result obtained by the settlement processing section 308. In this embodiment, the settlement result notifying section 310 transmits the settlement result information including the settlement processing ID, the account identification information, the result code (true when the settlement processing is completed normally, and false when not), the processing time stamp, the payer information, and the settlement amount, to the credit card usage management device 10.

[2-5. Functions of the Second Settlement Processing Server]

Figure 6:
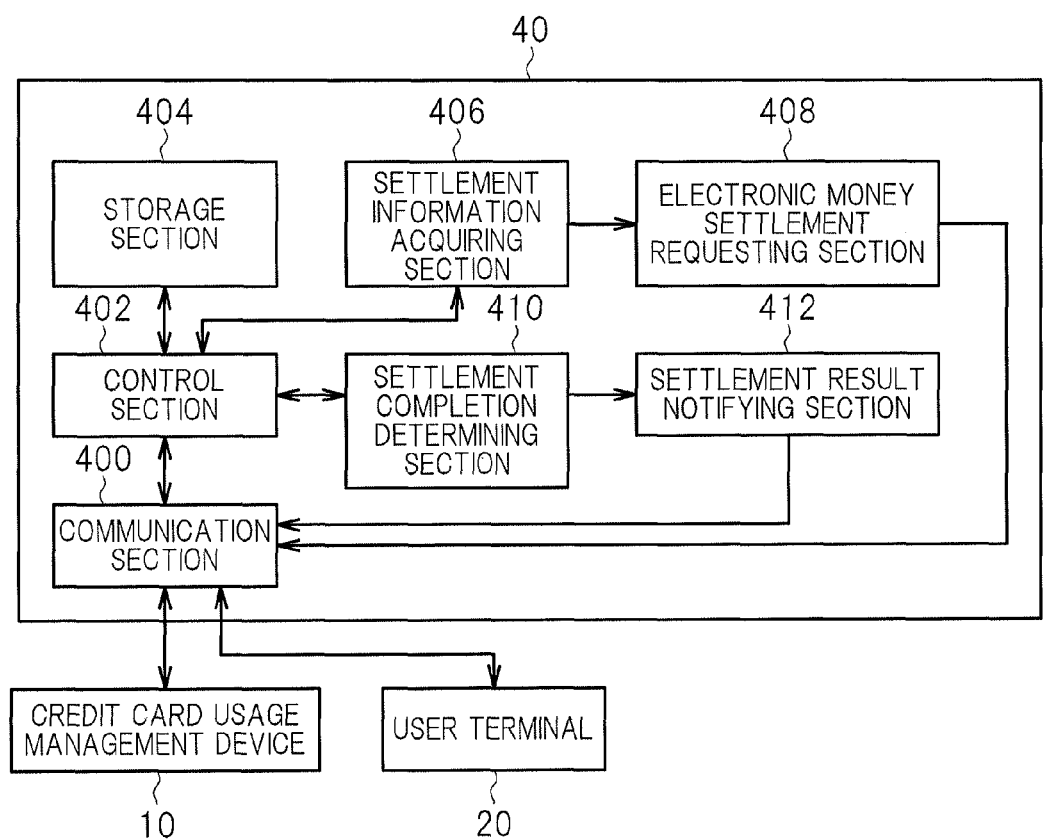
FIG. 6 A functional block diagram of a second settlement processing server.

FIG. 6 illustrates a functional block diagram of the second settlement processing server 40. As illustrated in FIG. 6, the second settlement processing server 40 includes, for example, a communication section 400, a control section 402, a storage section 404, a settlement information acquiring section 406, an electronic money settlement requesting section 408, a settlement completion determining section 410, and a settlement result notifying section 412. The functions of the above-mentioned respective sections may be implemented by the control means such as a central processing unit (CPU), the storage means such as a semiconductor memory or a magnetic disk drive, and the communication means such as a network interface that are included in the computer.

The communication section 400 is implemented by, for example, the network interface, and performs data communications to/from external devices. In this embodiment, the second settlement processing server 40 uses the communication section 400 to perform data communications to/from at least the credit card usage management device 10 and the user terminal 20.

The control section 402 executes the program stored in the storage section 404 to control the respective sections of the second settlement processing server 40 and execute various kinds of processing. The storage section 404 stores the program executed by the control section 402 and data therefor, and is also used as a work memory for the control section 402.

The settlement information acquiring section 406 acquires information on the settlement request for the settlement using the electronic money from the credit card usage management device 10. In this embodiment, the settlement request acquired by the settlement information acquiring section 406 includes the card company ID, the settlement processing ID, the settlement amount, and the identification information (address information) on the user terminal 20 for executing the settlement processing.

The electronic money settlement requesting section 408 requests the user terminal 20 included in the information on the settlement request for the electronic money settlement based on the information on the settlement request acquired by the settlement information acquiring section 406. In this embodiment, the electronic money settlement requesting section 408 may request the user terminal 20 identified based on the settlement request to activate the electronic money settlement program, and may also notify the user terminal 20 of the settlement processing ID and the settlement amount.

The settlement completion determining section 410 determines whether or not the electronic money settlement executed by the user terminal 20 in response to the request made by the electronic money settlement requesting section 408 has been completed normally. The settlement completion determining section 410 may perform the above-mentioned determination based on the settlement result information transmitted from the user terminal 20.

The settlement result notifying section 412 notifies the credit card usage management device 10 of the settlement result determined by the settlement completion determining section 410. In this embodiment, the settlement result notifying section 412 transmits the settlement result information including the settlement processing ID, the result code (true when the settlement processing is completed normally, and false when not), the processing time stamp, the payer information, and the settlement amount, to the credit card usage management device 10.

[3. Flow of the Immediate Settlement Processing]

Figure 11:
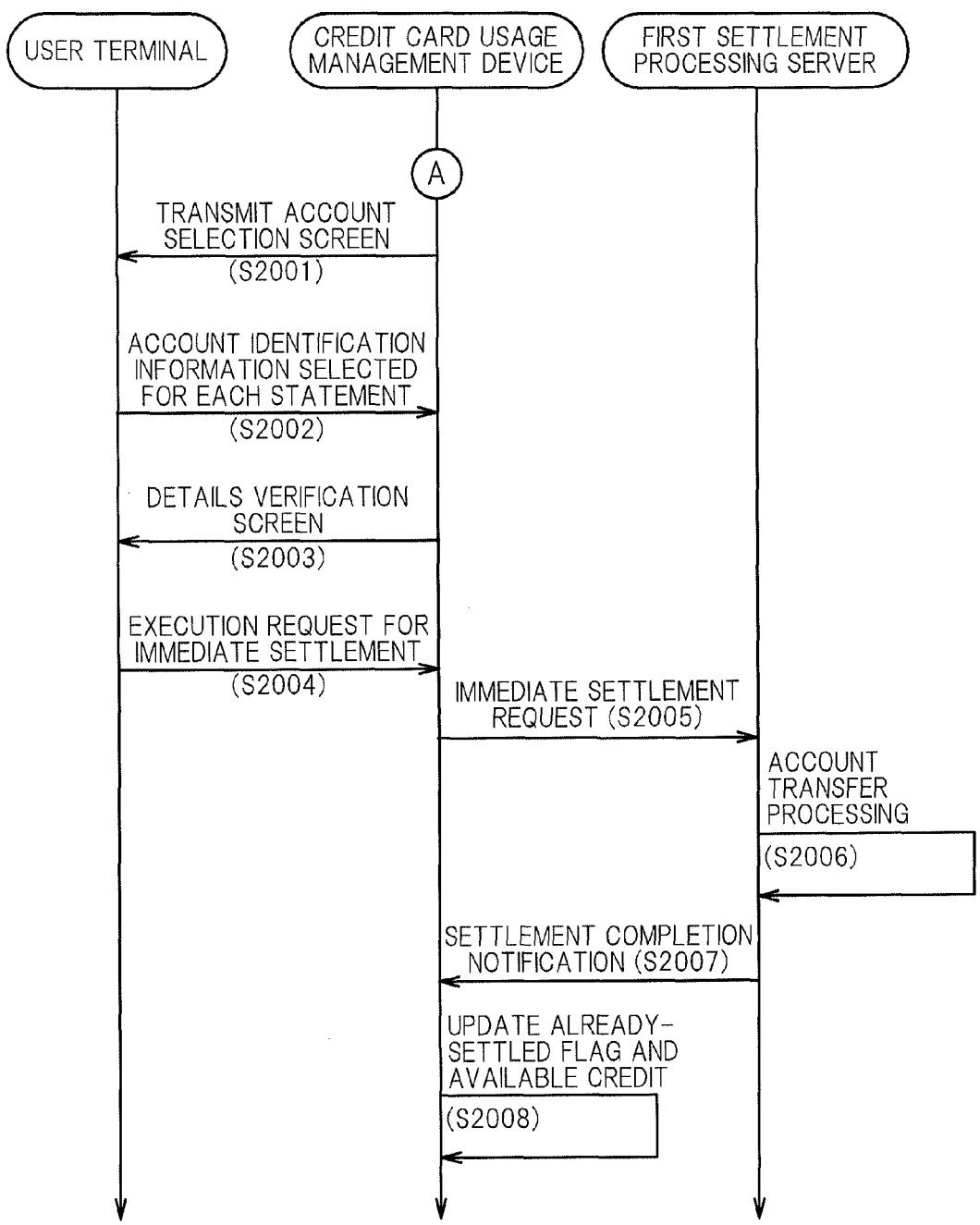
FIG. 11 A sequence diagram of a case where an account transfer is selected.
Figure 12:
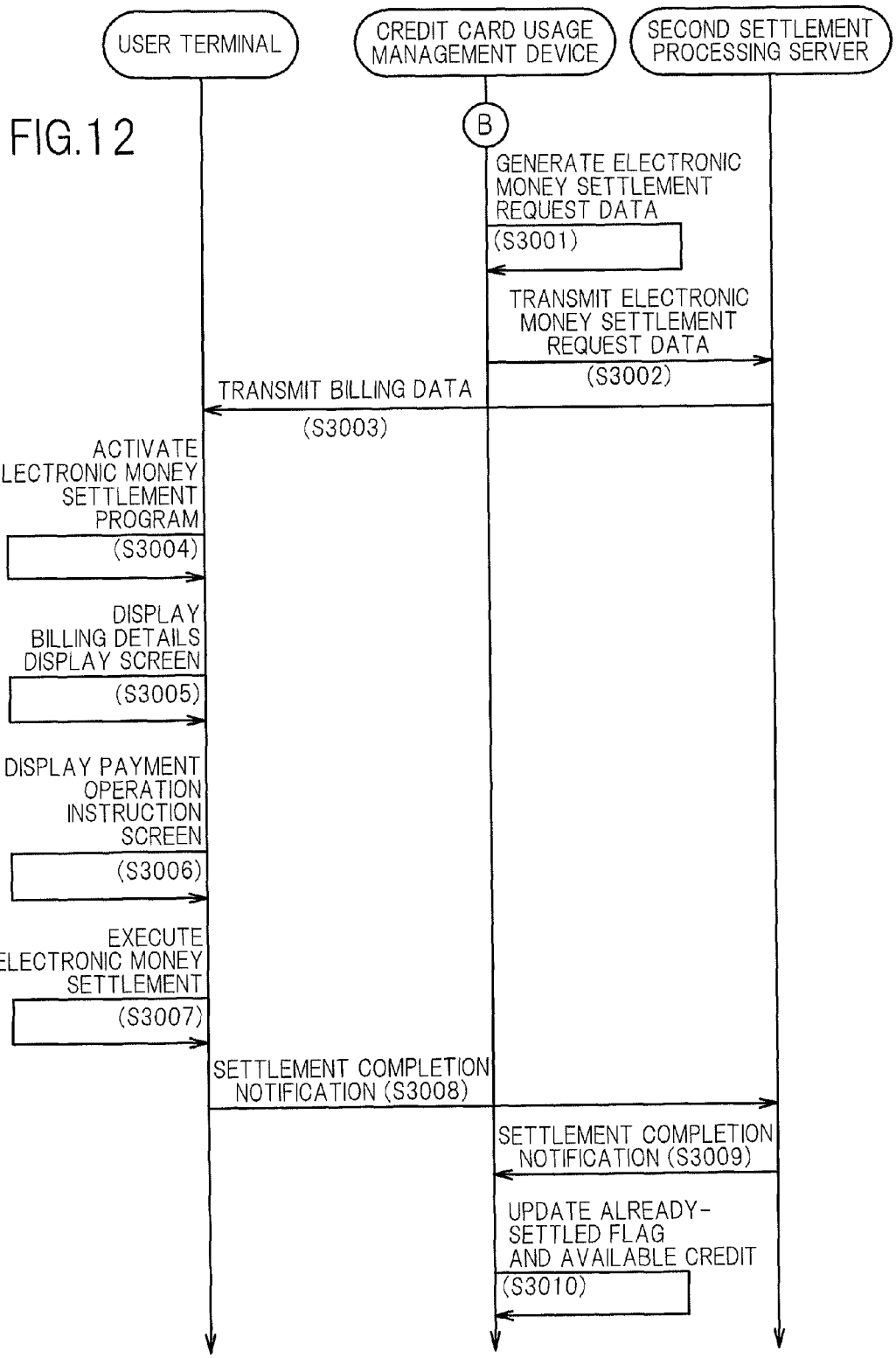
FIG. 12 A sequence diagram of a case where an electronic money settlement is selected.

Next, a flow of immediate settlement processing performed in the credit card settlement system 1 is described with reference to sequence diagrams illustrated in FIGS. 10 to 12.

Figure 10:
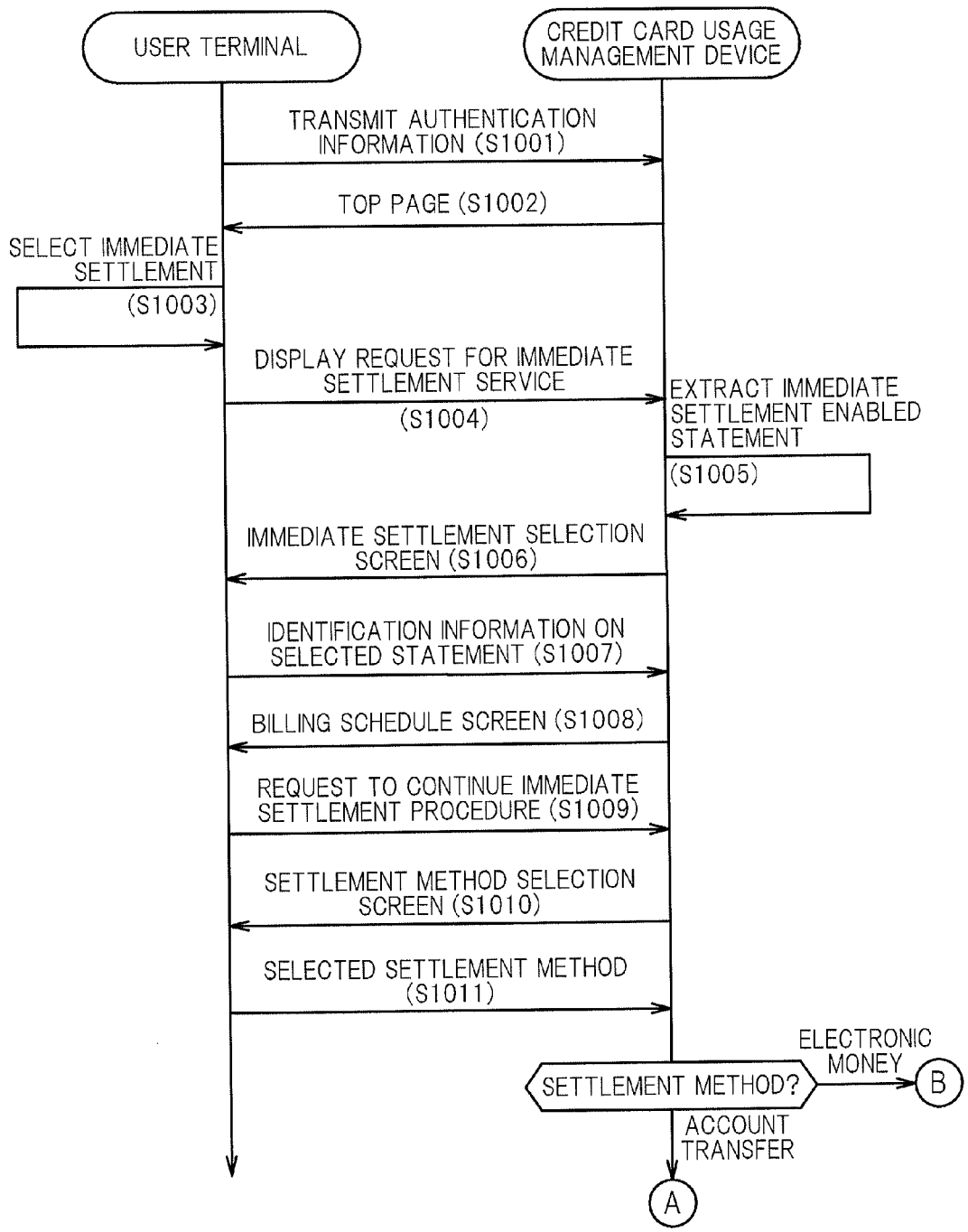
FIG. 10 A sequence diagram of immediate settlement processing.

As illustrated in FIG. 10, the user terminal 20 transmits the authentication information including the login ID and the password to the credit card usage management device 10 (S1001), and when the authentication based on the authentication information is successful on the credit card usage management device 10, the display data for displaying a top page is transmitted from the credit card usage management device 10 (S1002).

FIG. 13 illustrates an example of a top page screen. In the example of the top page screen illustrated in FIG. 13, a list of services is displayed, and a button for displaying a verification screen for the usage statement, a button for displaying a procedure screen for the immediate settlement, a button for displaying the verification screen for the credit limit and the available credit, and the like are included therein.

When the user selects the button regarding the immediate settlement on the top page screen (S1003), a screen display request for an immediate settlement service is transmitted to the credit card usage management device 10 (S1004). The credit card usage management device 10 extracts an immediate settlement enabled statement in response to the received display request (S1005), and the display data on an immediate settlement selection screen for displaying the extracted statements in such a manner that each thereof can be selected is transmitted to the user terminal 20 (S1006).

FIG. 14 illustrates an example of an immediate settlement statement selection screen. In the example of the immediate settlement statement selection screen illustrated in FIG. 14, a statement-basis record includes a check box, the date of use, the shop of purchase, the user, the payment type, and the used amount.

In the immediate settlement statement selection screen illustrated in FIG. 14, when the user clicks on a "selection button" after inputting a mark in the check box for the statement to be subjected to the immediate settlement, the identification information on the selected statement is transmitted to the credit card usage management device 10 (S1007). Based on the statement selected as the subject of the immediate settlement by the user, the credit card usage management device 10 generates such a billing schedule screen for displaying billing details including the settlement amount for the immediate settlement and a settlement schedule amount at the next time of periodic settlement as illustrated in FIG. 15, and transmits the display data for displaying the generated billing schedule screen to the user terminal 20 (S1008).

When the user presses a verification button on the billing schedule screen illustrated in FIG. 15 to make a request to continue a procedure for the immediate settlement processing (S1009), the display data for displaying such a settlement method selection screen as illustrated in FIG. 16 is transmitted in response to the request from the credit card usage management device 10 to the user terminal 20 (S1010).

On the settlement method selection screen illustrated in FIG. 16, the account transfer or the electronic money settlement can be selected, and by pressing a link to each thereof, an immediate settlement method is selected and the selected settlement method is transmitted to the credit card usage management device 10 (S1011).

[3-1. Processing Performed in a Case where the Account Transfer is Selected]

First, processing performed in a case where the account transfer is selected as the immediate settlement method is described with reference to FIG. 11.

The display data on such an account selection screen used for the immediate settlement as illustrated in FIG. 17 is transmitted from the credit card usage management device 10 (S2001). In order to add a new account used for the immediate settlement, an account addition button shown on the account selection screen may be pressed to input the account information on the account to be added. Further, the state of each account may be verified by pressing a link to the account included in the account selection screen illustrated in FIG. 17 to display such an account information verification screen as illustrated in FIG. 18 which includes a branch name, the deposit type, the account number, and a balance which are acquired from the settlement processing server for managing the account. Note that, one settlement account may be used for all the statements to be subjected to the immediate settlement, or the settlement account may be selected for each of the statements. When a confirm button included in the account selection screen illustrated in FIG. 17 is pressed, the account identification information selected for the settlement account with regard to each of the statements is transmitted from the user terminal 20 to the credit card usage management device 10 (S2002). In this manner, the account to be used for the immediate settlement may be a previously registered account, or may be an account newly registered when information on the immediate settlement is designated. It should be understood that the account to be used for the immediate settlement may be selected from both the previously registered account and account newly registered when the information on the immediate settlement is designated.

The display data for displaying such a details verification screen for the immediate settlement corresponding to the user selection as illustrated in FIG. 19 is transmitted from the credit card usage management device 10 (S2003). When the user presses an execution button included in the details verification screen, an execution request for the immediate settlement is transmitted to the credit card usage management device 10 (S2004), and the credit card usage management device 10 transmits an immediate settlement request designated by the user to the first settlement processing server 30 (S2005).

The first settlement processing server 30 executes account transfer processing based on the immediate settlement request received from the credit card usage management device 10 (S2006), and transmits the settlement completion notification thereof to the credit card usage management device 10 (S2007).

When receiving the settlement completion notification from the first settlement processing server 30, the credit card usage management device 10 updates the already-settled flag of the statement subjected to the immediate settlement, and also updates the available credit by adding thereto the settlement amount by which the immediate settlement has been performed (S2008).

FIG. 20 illustrates an example of the immediate settlement statement selection screen updated after the immediate settlement. As illustrated in FIG. 20, the statement that has been subjected to the immediate settlement is deleted from a list of the immediate settlement enabled statements, and also the available credit after the update has increased by the amount for the immediate settlement compared to the available credit before the update.

[3-2. Processing Performed in a Case where the Electronic Money Settlement is Selected]

Next, processing performed in a case where the electronic money settlement is selected as the immediate settlement method is described with reference to FIG. 12.

When receiving data indicating that the electronic money settlement has been selected on the user terminal 20, the credit card usage management device 10 generates electronic money settlement request data based on details of the immediate settlement selected by the user (S3001), and transmits the generated electronic money settlement request data to the second settlement processing server 40 (S3002).

The second settlement processing server 40 transmits the billing data regarding the electronic money settlement processing to the user terminal 20 (S3003), and causes the user terminal 20 to start the activation of the electronic money settlement program (S3004). The user terminal 20 displays such a billing details display screen as illustrated in FIG. 21 based on the received billing data (S3005). When the user selects "next" after the settlement amount displayed on the billing details display screen illustrated in FIG. 21 is verified, such a payment operation instruction screen as illustrated in FIG. 22, which instructs the user to hold the electronic money retaining medium (IC card) over the IC card reader/writer 22, is displayed (S3006). When the electronic money settlement is executed after the user holds the electronic money retaining medium over the IC card reader/writer 22 in accordance with the display of the payment operation instruction screen (S3007), such a payment completion screen as illustrated in FIG. 23 is displayed.

When the electronic money settlement is completed, a completion notification of the electronic money settlement is transmitted from the user terminal 20 to the second settlement processing server 40 (S3008). The second settlement processing server 40 transmits the settlement completion notification to the credit card usage management device 10 in response to the completion notification received from the user terminal 20 (S3009).

When receiving the settlement completion notification from the second settlement processing server 40, the credit card usage management device 10 updates the already-settled flag of the statement subjected to the immediate settlement, and also updates the available credit by adding thereto the settlement amount by which the immediate settlement has been performed (S3010).

When the immediate settlement using the electronic money is completed, as illustrated in FIG. 20, contents of the immediate settlement statement selection screen are updated, the statement that has been subjected to the immediate settlement is deleted from the list of the immediate settlement enabled statements, and further, the available credit after the update increases by the amount for the immediate settlement compared to the available credit before the update.

The credit card settlement system 1 according to this embodiment allows the immediate settlement to be performed during a period after the usage statement of the credit card is registered by the credit card usage management device 10 until being confirmed as the subject of the periodic settlement, which allows the user to recover the available credit at a desired timing. Further, it can be selected for each usage statement which settlement method of the account transfer and the electronic money is used for the settlement, and the account can be selected for each usage statement in the case where the immediate settlement is performed by using the account transfer, which can improve convenience of the user. In addition, the credit card settlement system 1 according to this embodiment is also advantageous for a credit card company in that cash can be collected from the user at an early stage.

Second Embodiment

Next, a credit card settlement system 1 according to a second embodiment of the present invention is described. The credit card settlement system 1 according to the second embodiment is different from the first embodiment in that the usage statement to be subjected to the immediate settlement is identified based on a predefined condition. Note that, a credit card usage management device 11 according to the second embodiment partially has different components from the credit card usage management device 10 according to the first embodiment, but the same components as the first embodiment are employed by the other devices included in the credit card settlement system 1, and different points from the first embodiment are mainly described below.

Figure 24:
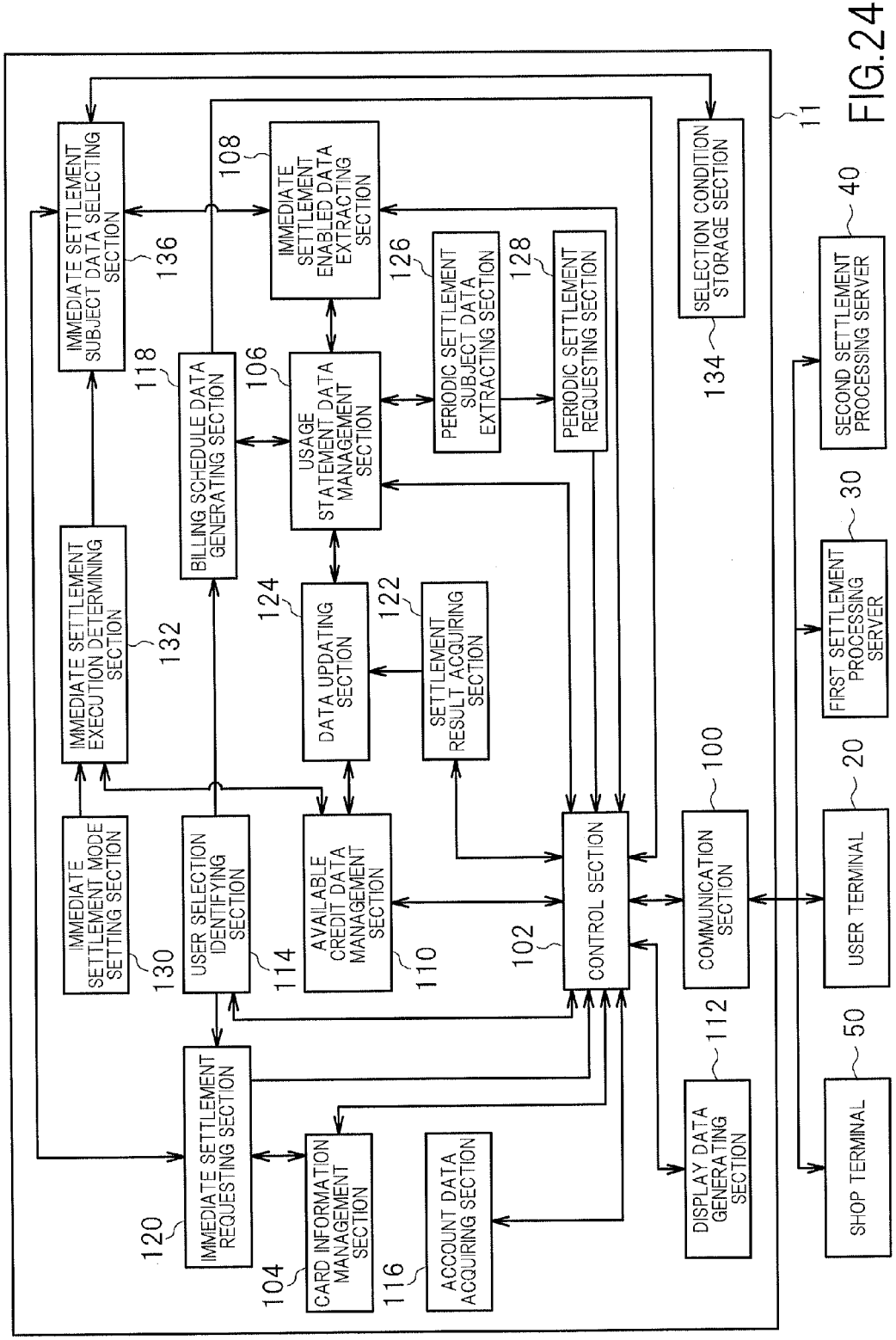
FIG. 24 A functional block diagram of a credit card usage management device according to a second embodiment.

FIG. 24 illustrates a functional block diagram of the credit card usage management device 11 according to the second embodiment. As illustrated in FIG. 24, the credit card usage management device 11 includes an immediate settlement mode setting section 130, an immediate settlement execution determining section 132, a selection condition storage section 134, and an immediate settlement subject data selecting section 136, in addition to the communication section 100, the control section 102, the card information management section 104, the usage statement data management section 106, the immediate settlement enabled data extracting section 108, the available credit data management section 110, the display data generating section 112, the user selection identifying section 114, the account data acquiring section 116, the billing schedule data generating section 118, the immediate settlement requesting section 120, the settlement result acquiring section 122, the data updating section 124, the periodic settlement subject data extracting section 126, and the periodic settlement requesting section 128.

On the computer including the control means such as a central processing unit (CPU), the storage means such as a semiconductor memory or a magnetic disk drive, and the communication means such as a network interface, the functions of the above-mentioned respective sections provided to the credit card usage management device 11 are implemented by the control means sequentially executing a program stored in the storage means. The program may be supplied to the credit card usage management device 11 while being stored in an information storage medium, or may be supplied to the credit card usage management device 11 via the data communication means such as the Internet. Note that, in this embodiment, a database for storing data managed by the usage statement data management section 106, the available credit data management section 110, the selection condition storage section 134, and the like is provided inside the credit card usage management device 11, but the database may be provided outside the credit card usage management device 11, and the credit card usage management device 11 may appropriately read data from the database provided outside or write data to the database.

In the following, functional blocks denoted by the same reference numerals as the first embodiment have the same functions as the first embodiment, and hence descriptions thereof are omitted, and detailed descriptions are given of the immediate settlement mode setting section 130, the immediate settlement execution determining section 132, the selection condition storage section 134, and the immediate settlement subject data selecting section 136, which are added in the second embodiment.

The immediate settlement mode setting section 130 sets an immediate settlement mode, which indicates a state in which the immediate settlement is automatically used, for each identification information on the credit card. For example, with regard to the identification information on the subject credit card, the immediate settlement mode setting section 130 sets the immediate settlement mode to "ON" when an instruction to enable the immediate settlement mode is received from a user terminal, and sets the immediate settlement mode to "OFF" when an instruction to disable the immediate settlement mode is received from the user terminal. Note that, when the immediate settlement mode is set to "OFF", the immediate settlement may not be used at all, or only the immediate settlement for the usage statement selected by the user, which is described in the first embodiment, may be used.

The immediate settlement execution determining section 132 determines, with regard to the identification information on the subject credit card, that the immediate settlement is to be executed in a case where the immediate settlement mode is enabled by the immediate settlement mode setting section 130 and in a case where a predetermined immediate settlement execution condition is satisfied. For example, the immediate settlement execution determining section 132 may determine that the immediate settlement is to be executed with regard to the identification information on the subject credit card in a case where the immediate settlement mode is enabled with regard to the identification information on the subject credit card and in a case where the available credit managed by the available credit data management section 110 with regard to the identification information on the subject credit card satisfies a predetermined condition (for example, a case of being equal to or smaller than a threshold value or a case of being less than the threshold value). Note that, the above-mentioned threshold value may be previously set by the administrator or the user, or may be changed depending on the number of days ranging from the current day/time to the closing date or the confirmed date for the credit card. It should be understood that as the immediate settlement execution condition is not limited to the above-mentioned condition, and another condition such as an arrival of a predefined timing may be used. Further, an embodiment mode in which "ON/OFF" of the immediate settlement mode is not managed may be configured to execute the immediate settlement when the immediate settlement execution condition is satisfied.

The immediate settlement enabled data extracting section 108 extracts the immediate settlement enabled usage statement when the immediate settlement execution determining section 132 determines that the immediate settlement is to be executed with regard to the identification information on the subject credit card. Note that, a method of extracting the immediate settlement enabled usage statement may be the same as the first embodiment.

The selection condition storage section 134 stores one or a plurality of selection conditions for selecting the usage statement to be subjected to the immediate settlement from among the usage statements extracted by the immediate settlement enabled data extracting section 108. Note that, the selection condition may be set for each settlement method stored in the card information management section 104 for each identification information on the credit card.

FIG. 25 illustrates an example of the selection condition stored in the selection condition storage section 134. In the example illustrated in FIG. 25, each selection condition for selecting the usage statement to be subjected to the immediate settlement by each settlement method is defined with regard to the settlement method related to each of a main account and a sub account stored in association with the identification information on the credit card. For example, a priority may be set for each selection condition regarding the settlement method, the usage statements may be selected in order from the selection condition given a higher priority, and the usage statements may be selected until a total amount of the selected usage statements becomes equal to or larger than a target amount of the immediate settlement subject. Further, the target amount of the immediate settlement subject may be set as, for example, an amount obtained by subtracting a current available credit from a target value of the available credit previously set in association with the identification information on the credit card. Note that, the selection conditions may include a statement selection condition that specifies a condition to be satisfied by items (for example, the date of use, the shop of purchase, the user, the payment type, and the used amount) of the usage statement to be selected and an entire amount condition that specifies an upper limit value of the total amount of the usage statements selected by the statement selection condition.

The immediate settlement subject data selecting section 136 selects the usage statement to be subjected to the immediate settlement based on the selection condition stored in the selection condition storage section 134 with regard to the identification information on the subject credit card from among the usage statements extracted by the immediate settlement enabled data extracting section 108 with regard to the identification information on the subject credit card. For example, the immediate settlement subject data selecting section 136 executes processing for selecting the usage statements to be subjected to the immediate settlement in order based on the selection condition given the higher priority among the selection conditions stored in the selection condition storage section 134 with regard to the identification information on the subject credit card from among the usage statements extracted by the immediate settlement enabled data extracting section 108, until the total amount of the selected usage statements becomes equal to or larger than the target amount of the immediate settlement subject.

For example, based on the selection condition illustrated in FIG. 25, in a case where the immediate settlement is executed with regard to the identification information "C0001" on the credit card, when a current value of the available credit is 50,000 yen and the target value of the available credit defined in advance is 100,000 yen, the target amount of the immediate settlement subject is 50,000 yen. At this time, based on the selection condition regarding the main account given the highest priority (first selection condition), the immediate settlement subject data selecting section 136 first selects the usage statement "C0001-m0002" (see FIG. 8) corresponding to 20,000 yen being the upper limit value of the first selection condition, as the immediate settlement subject using the main account, from among the usage statements whose payment type is "revolving". Here, the target amount of the immediate settlement subject, which is 50,000 yen, is short by 30,000 yen, and hence the immediate settlement subject data selecting section 136 selects the usage statement "C0001-m0003" (see FIG. 8) corresponding to 30,000 yen stated above, as the immediate settlement subject for the sub account, based on the selection condition regarding the sub account given the second highest priority (second selection condition).

The immediate settlement requesting section 120 issues the settlement request to settle the total amount of the usage statements selected with regard to the settlement method, for each settlement method selected by the immediate settlement subject data selecting section 136, to the settlement processing server corresponding to the settlement method. Note that, processing performed after the immediate settlement is requested is the same as the first embodiment, and hence a description thereof is omitted.

Next, a flow of immediate settlement processing performed in the credit card usage management device 11 according to the second embodiment is described with reference to flowcharts illustrated in FIGS. 26A and 26B. Here, a description is made of a case where the immediate settlement processing is executed when the sales data is received from the shop terminal 50.

As illustrated in FIG. 26A, the credit card usage management device 11 registers the usage statement data on the credit card based on the sales data received from the shop terminal 50 (S4001), and updates information on the available credit stored in association with the identification information on the credit card (S4002). Specifically, the credit card usage management device 11 subtracts the total amount of the used amount regarding the usage statement data registered in Step S4001 from the available credit stored in association with the identification information on the credit card. Then, the credit card usage management device 11 stands by in a case where the immediate settlement mode is not set with regard to the identification information on the subject credit card (S4003: N), and in a case where the immediate settlement mode is set (S4003: Y), advances to the processing of Step S4004.

The credit card usage management device 11 stands by in a case where the available credit stored with regard to the identification information on the subject credit card does not satisfy a predetermined immediate settlement execution condition (here, case of not being equal to or smaller than the threshold value) (S4004: N), and in a case where a predetermined condition is satisfied (here, a case of being equal to or smaller than the threshold value) (S4004: Y), determines that the immediate settlement is to be executed (S4005). Here, the credit card usage management device 11 calculates the target amount of the immediate settlement based on a difference between the current value of the available credit and the target value (S4006).

The credit card usage management device 11 refers to the selection condition set for each settlement method stored in association with the identification information on the subject credit card (S4007).

Subsequently, as illustrated in FIG. 26B, the credit card usage management device 11 selects the selection condition (referred to as a selection condition of interest) given the priority of i ((initial value of i)=1) from among the selection conditions that have been referred to (S4008), and selects the usage statement to be subjected to the immediate settlement based on the selection condition of interest from among the immediate settlement enabled usage statements extracted based on the identification information on the subject credit card (S4009). When the total amount of all the usage statements selected by the selection conditions given the priorities 1 to i does not reach the target amount of the immediate settlement (S4010: N), the credit card usage management device 11 adds one to the priority i (S4011), and returns to Step S4008. Further, when the total amount of all the usage statements selected by the selection conditions given the priorities 1 to i reaches the target amount of the immediate settlement (S4010: Y), the total amount of the usage statements selected for each selection condition is calculated (S4012).

The credit card usage management device 11 transmits the settlement request for the settlement of the total amount of the usage statements selected for each selection condition to a corresponding settlement server for each selection condition (S4013).

When receiving a notification of a settlement completion from each settlement server (S4014), the credit card usage management device 11 updates the available credit by adding the total amount of the usage statements related to the settlement completion to the current value of the available credit (S4015), also updates data on the usage statement stored in association with the identification information on the subject credit card (S4016), and ends the processing.

According to the credit card usage management device 11 of the second embodiment described above, when it is determined that the immediate settlement is to be executed, the usage statement to be subjected to the immediate settlement is selected based on the selection condition for the usage statement defined for each settlement method previously registered with regard to the identification information on the subject credit card, and the immediate settlement of the selected usage statement is executed, which can recover the available credit regarding the identification information on the subject credit card.

Further, in the second embodiment, in the case where the immediate settlement mode is set, the immediate settlement subject data selecting section 136 may select an entirety or a part of the immediate settlement enabled usage statements as the immediate settlement subject. At this time, the immediate settlement subject data selecting section 136 may assign the selected usage statements to a plurality of settlement methods that are previously registered, to thereby perform the immediate settlement therefor. In this case, the immediate settlement subject data selecting section 136 may assign the usage statement data to be subjected to the settlement using each of the settlement methods to the each thereof based on the settlement amount or the ratio of the settlement amount previously defined for each settlement method.

The present invention is not limited to the embodiments described above. For example, in the above-mentioned embodiments, to simplify the description, the number of provided first settlement processing servers 30 for managing the accounts and the number of provided second settlement processing servers 40 for managing the electronic money are one each, but the first settlement processing server 30 and the second settlement processing server 40 may be provided for each bank and for each type of electronic money, respectively, and it should be understood that the present invention is applied even in such an environment.

The invention claimed is:

1. A credit card usage management system, comprising:
    extraction means for extracting, before a timing on which a billing subject of a periodic settlement is extracted, pieces of statement data that have not been settled and are stored in storage means for storing a statement data history including a used amount of a credit card and an available credit for the credit card in association with identification information on the credit card;
    identification means for identifying pieces of statement data selected by a user from among the pieces of statement data extracted by the extraction means, based on data received from a user terminal;
    settlement request transmitting means for transmitting a settlement request to settle a total amount of the used amounts respectively included in the pieces of statement data identified by the identification means by using a settlement method designated by the user, to a settlement processing server corresponding to the settlement method;
    available credit updating means for adding the total amount to the available credit stored in the storage means when a completion notification of a settlement based on the settlement request is received from the settlement processing server; and
    periodic settlement request transmitting means for transmitting, after the timing on which the billing subject of the periodic settlement is extracted, a settlement request to settle at least a part of a total amount of the used amounts respectively included in the pieces of statement data that have not been settled and are stored in the storage means by using a predetermined settlement method associated with identification information of the credit card, to a predetermined settlement processing server corresponding to the predetermined settlement method.

2. The credit card usage management system according to claim 1, further comprising means for receiving a designation of the settlement method for each of the pieces of statement data identified by the identification means, wherein:
    the settlement request transmitting means transmits, for each settlement method subjected to the receiving, the total amount of the used amounts respectively included in the pieces of statement data for which the settlement method is designated to the settlement processing server corresponding to the each settlement method; and
    the available credit updating means adds, for the each settlement method subjected to the receiving, when the completion notification of the settlement is received from the settlement processing server corresponding to the each settlement method, the total amount of the used amounts respectively included in the pieces of statement data for which the settlement method is designated to the available credit stored in the storage means.

3. The credit card usage management system according to claim 1, wherein:
    the identification means identifies, for each settlement method designated by the user, the pieces of statement data to be settled by using the each settlement method based on the data received from the user terminal; and
    the settlement request transmitting means transmits the settlement request to settle the total amount of the used amounts respectively included in the pieces of statement data identified by the identification means for the each settlement method designated by the user, to the settlement processing server corresponding to the each settlement method.

4. The credit card usage management system according to claim 1, further comprising notification means for referring to the available credit stored in the storage means in association with the identification information on the credit card at a predetermined timing and, when the available credit satisfies a predetermined condition, notifying a destination corresponding to the identification information on the credit card, of predetermined information.

5. The credit card usage management system according to claim 4, wherein the predetermined information comprises the available credit.

6. The credit card usage management system according to claim 1, wherein:

each of the pieces of statement data comprises an already-settled flag indicating whether or not the settlement has been completed; and the credit card usage management system further comprises statement data updating means for updating, when the completion notification of the settlement based on the settlement request is received from the settlement processing server, the already-settled flag of each of the pieces of statement data identified by the identification means to a value indicating that the settlement has been completed.

7. The credit card usage management system according to claim 6, wherein the extraction means extracts, from among the pieces of statement data stored in the storage means, a piece of statement data whose date of use falls within a given period and whose settlement has not been completed.

8. The credit card usage management system according to claim 6, wherein the extraction means extracts, from among the pieces of statement data stored in the storage means, a piece of statement data whose state value is a predetermined value and whose settlement has not been completed.

9. The credit card usage management system according to claim 1, further comprising means for presenting a scheduled amount to be charged in a term corresponding to a given period based on the used amount of a piece of statement data whose date of use falls within the given period and whose settlement has not been completed among the pieces of statement data stored in the storage means.

10. The credit card usage management system according to claim 1, wherein the available credit updating means subtracts, when a piece of statement data is newly stored in the storage means, the used amount included in the newly-stored piece of statement data from the available credit stored in the storage means.

11. The credit card usage management system according to claim 1, wherein the settlement method designated by the user comprises at least one of a payment from a deposits-and-savings account and an electronic money settlement, which is designated by the user.

12. A credit card usage management method, comprising:
an extraction step of extracting, by a computer, before a timing on which a billing subject of a periodic settlement is extracted, pieces of statement data that have not been settled and are stored in storage means for storing a statement data history including a used amount of a credit card and an available credit for the credit card in association with identification information on the credit card;
an identification step of identifying, by the computer, pieces of statement data selected by a user from among the pieces of statement data extracted in the extraction step, based on data received from a user terminal;
a settlement request transmitting step of transmitting, by the computer, a settlement request to settle a total amount of the used amounts respectively included in the pieces of statement data identified in the identification step by using a settlement method designated by the user, to a settlement processing server corresponding to the settlement method;

an available credit updating step of adding, by the computer, the total amount to the available credit stored in the storage means when a completion notification of a settlement based on the settlement request is received from the settlement processing server; and a periodic settlement request transmitting step of transmitting, after the timing on which the billing subject of the periodic settlement is extracted, a settlement request to settle at least a part of a total amount of the used amounts respectively included in the pieces of statement data that have not been settled and are stored in the storage means by using a predetermined settlement method associated with identification information of the credit card, to a predetermined settlement processing server corresponding to the predetermined settlement method.

13. The credit card usage management device according to claim 1, wherein each of the pieces of statement data includes an already-settled flag indicating whether or not the settlement has been completed and an already-confirmed flag indicating whether or not the confirmation has been completed, and the credit card usage management device further comprises:

status updating means for updating, on a predetermined first timing, the already-confirmed flag of each of the pieces of statement data stored in the storage means to a value indicating that the confirmation has been completed; and statement data updating means for updating, when the completion notification of the settlement based on the settlement request is received from the settlement processing server, the already-settled flag of each of the pieces of statement data identified by the identification means to a value indicating that the settlement has been completed, and wherein the extraction means extracts statement data stored in the storage means that have not been settled and not confirmed, and the periodic settlement request transmitting means transmits, on a predetermined second timing after the first timing, a settlement request to settle at least a part of a total amount of the used amounts respectively included in the pieces of statement data that have not been settled and not confirmed and are stored in the storage means by using the predetermined settlement method associated with identification information of the credit card, to the predetermined settlement processing server corresponding to the predetermined settlement method.

* * * * *